US006771966B1

(12) United States Patent
Chow

(10) Patent No.: US 6,771,966 B1
(45) Date of Patent: Aug. 3, 2004

(54) SYSTEM AND METHOD FOR AN AUTOMATED RADIO NETWORK PLANNING TOOL

(75) Inventor: Peter El Kwan Chow, Orlando, FL (US)

(73) Assignee: Carriercomm, Inc., Santa Barbara, CA (US)

( * ) Notice: Subject to any disclaimer, the term of this patent is extended or adjusted under 35 U.S.C. 154(b) by 517 days.

(21) Appl. No.: 09/715,235

(22) Filed: Nov. 17, 2000

Related U.S. Application Data

(63) Continuation-in-part of application No. 09/280,214, filed on Mar. 29, 1999.

(51) Int. Cl.[7] .................................................. H04Q 7/20
(52) U.S. Cl. ........................................ 455/446; 455/75
(58) Field of Search ................................. 455/446, 447, 455/449, 452.1, 453, 454, 423, 67.11, 67.14, 67.16, 75

(56) References Cited

U.S. PATENT DOCUMENTS

| | | | | |
|---|---|---|---|---|
| 5,095,500 A | * | 3/1992 | Tayloe et al. ............ | 379/32.01 |
| 5,490,285 A | * | 2/1996 | Ahlenius et al. ............ | 455/446 |
| 5,668,562 A | * | 9/1997 | Cutrer et al. ............... | 343/703 |
| 5,826,218 A | * | 10/1998 | Khafizov et al. ........... | 702/179 |
| 5,960,351 A | * | 9/1999 | Przelomiec ................. | 455/450 |
| 5,974,323 A | * | 10/1999 | Doner ........................ | 455/447 |
| 5,987,322 A | * | 11/1999 | Gupta et al. .............. | 455/432.1 |
| 6,021,329 A | * | 2/2000 | Kornestedt et al. ......... | 455/446 |
| 6,094,581 A | * | 7/2000 | Fried et al. ................. | 455/449 |
| 6,178,328 B1 | * | 1/2001 | Tang et al. ................. | 455/447 |
| 6,212,386 B1 | * | 4/2001 | Briere et al. ................ | 455/447 |
| 6,356,758 B1 | * | 3/2002 | Almeida et al. ............ | 455/446 |

OTHER PUBLICATIONS

U.S. patent application Ser. No. 09/280,214, Chow, filed Mar. 29, 1999.
U.S. patent application Ser. No. 09/140,295, Chow, filed Aug. 25, 1998.
U.S. patent application Ser. No. 06/245,701, Gulliford et al., filed Feb. 6, 1999.

* cited by examiner

Primary Examiner—Jean Gelin
(74) Attorney, Agent, or Firm—Fulbright & Jaworski LLP

(57) ABSTRACT

A system and method are disclosed for planning the deployment of a plurality of receiver/transmitter pairs such that wireless communication links may be established meeting design criteria and allowing for the addition of future wireless communication links. A master planning tool is preferably provided which utilizes a simplified set of design rules in order to allow for the analysis of a large number of mutually interfered wireless communication links. Preferably, link analysis is accomplished in multiple orders of analysis, such as a master planning analysis, a wireless link design analysis, a field verification analysis, and/or an in-service analysis. Link planning according to the present invention provides for high density deployment of radios, such as for a urban area radio network. Additionally, link planning according to the present invention allows for the determination of an increased link density at particular sites to provide sharing of a resource located at that site as well as to provide a wide area topology to handle large area coverage. Link planning according to the present invention may also use link budget equations represented in a simplified tabular format by the estimation of included variables with constants and expected system and radio characteristics.

64 Claims, 8 Drawing Sheets

○ REPEATER SITES
— POSSIBLE LINKS WITHOUT RESTRICTION
- - POSSIBLE LINKS WITH RESTRICTIONS

- ○ REPEATER SITES
- ——— POSSIBLE LINKS WITHOUT RESTRICTION
- ------ POSSIBLE LINKS WITH RESTRICTIONS
- ▬▬▬ INSTALLED LINKS
- • UP-COMING SITES

SYSTEM AND METHOD FOR AN AUTOMATED RADIO NETWORK PLANNING TOOL

RELATED APPLICATIONS

The present application is a continuation-in-part of co-pending and commonly assigned U.S. Patent application entitled SYSTEM AND METHOD FOR RADIO FREQUENCY PLANNING, Ser. No. 09/280,214, filed Mar. 29, 1999, the disclosure of which is incorporated herein by reference.

Reference is made to co-pending and commonly assigned U.S. Patent Application entitled SYSTEM AND METHOD FOR ESTABLISHING A POINT TO POINT RADIO SYSTEM, Ser. No. 09/140,295, filed Aug. 25, 1998, and U.S. Patent Application entitled COMMERCIAL NETWORK TOPOLOGIES UTILIZING POINT TO POINT RADIOS, Ser. No. 09/245,701, filed Feb. 6, 1999, the disclosures of which are incorporated herein by reference.

TECHNICAL FIELD

This invention relates to deployment of radio systems and more particularly to systems and methods providing for the placement of transmitter/receiver paths to provide links at desired locations while minimizing interference.

BACKGROUND

In the past, high frequency high bandwidth wireless communication has been provided through the use of point-to-point radio systems, such as point-to-point microwave radio transmitters and receivers providing line of sight communications. Portions of the microwave spectrum of frequencies are made available for use in such point-to-point systems. High frequencies, such as the above mentioned microwave spectrum of frequencies, are generally desirable in providing high bandwidth communication because of their ability to provide large bandwidth in a relatively narrow portion, or channel, of the spectrum.

Presently, one desiring to establish point-to-point communications references a record of all the sites currently established using such microwave communications, and determines where a new link may be established which does not interfere with or receive interference from these established links. This has generally been acceptable where link deployment is scattered. However, the above described technique for deployment is not well suited for mass deployment of such radio links, such as is useful in the metropolitan area wireless networks shown and described in the above referenced patent application entitled COMMERCIAL NETWORK TOPOLOGIES UTILIZING POINT TO POINT RADIOS. Accordingly, other solutions must be utilized for mass deployment of radio systems. One such solution is shown and described in the above referenced patent application entitled SYSTEM AND METHOD FOR ESTABLISHING A POINT TO POINT RADIO SYSTEM. This solution allows for the mass deployment of radio systems through the regulated positioning and orientation of the communication nodes.

Before wireless high frequency communication service can be provided on a mass basis in an area there should exist a deployment technique that can support the planned service in order to provide for the desired location of links without restricting the ability to locate other links where necessary or desired. In order to provide for a dense deployment pattern, such a technique should be able to deploy a large number of radio links established where the antenna gain is at its maximum, i.e., two way radio communication established through main beams of both transmitting and receiving antennas, in a given area such that the individual radio links do not significantly interfere with one another.

There are a number of parameters that determine the magnitude of such interference, such as the antenna gain in the path of the interference, the "hop" distance between interfering and interfered systems, polarization isolation and frequency channel separation. For example, interference is at its worst when the interfering transmitting main beam is directed towards the interfered receiving main beam, somewhat less when the interfering main beam is directed toward the interfered receiving sidelobe, and even less when the interfering transmitting sidelobe is directed toward the interfered receiving sidelobe. Additionally, the interference decreases the farther apart, i.e., the greater the "hop" distance between the interfering and the interfered.

A good example of a radio frequency deployment scheme is the cell structure currently in use for cellular wireless service, which may be utilized in fixed location point-to-multipoint systems, which utilizes frequency reuse techniques. The cellular structure provides a model to show that the interference is controllable by frequency reuse and sectorization. Typically, in a cellular network, each set of frequencies is reused in every seventh cell, with each cell divided into three sectors, thereby defining a cellular frequency reuse pattern.

Cellular networks are broadcast based such that a transmitter sends out signals into a designated area and any properly tuned receiver within that area can pick up the signals. However, where radios work at high frequencies, such as point-to-point microwave systems typically operating above 18 GHz, the wavelengths are short so that for effective communication the transmitter and receiver are preferably pointing essentially directly at each other, i.e., line of sight. Such narrow beam transmission implies that the transmitters and receivers are all in fixed positions with respect to each other where their density is not great. Thus, in contrast to cellular systems, there is generally no need in these high frequency systems to "blanket" a given area with transmitted signals. This line of sight characteristic has allowed prior point-to-point systems to be constructed without much regard to each other.

However, interference between discrete systems will result when a particular receiver is within the radiation pattern of more than one transmitter. Accordingly, as the demand for high bandwidth communication systems increases the ability to establish links, deployed according to the above described technique, experiencing interference at or below desired levels becomes increasingly difficult. For example, existing links may be positioned and oriented such that an additional link from a particular location, such as an additional office building to be provided service, may not be able to be established due to unavoidable interference from existing links deployed without regard to any other links. Such a technique is not conducive to the implementation of densely deployed radios.

Further, as the number of desired nodes and network complexity increases, the complexity of the interference between nodes expands exponentially. Existing planning tools are unable to effectively and in a timely manner handle interference computations for such large sets of possible node combinations and permutations.

Thus, a need exists in the art for a system and method for developing a radio frequency deployment plan for transmitter/receiver pairs so as to minimize interference while providing for establishing links at desired sites. This system and method should identify the radio frequency plan efficiently. Further a need exists for the location of the desired sites to be freely located within a service region.

A further need exists for such a system and method in which not all of the communication links need be deployed at any time, but which will accommodate growth in any direction throughout the deployment region.

A further need exists for a system and method in which multiple combinations and permutations forming a network of sites are considered, analyzed and an optimized topology is identified.

A further need exists for such a system and method to consider environmental factors in its development of the radio frequency plan.

SUMMARY OF THE INVENTION

These and other objects, features and technical advantages are achieved by a system and method which provide a technique by which radio links may be densely deployed with minimized interference by making link determinations based on analysis of acceptable link combinations. According to a preferred embodiment of the present invention, multiple levels of link analysis are performed to determine an optimum network link configuration.

Preferably, the set of possible links connecting the various nodes of an RF network are first analyzed to identify the subset of practicably realizable links, i.e., those links which are within effective range, within line of sight and having an acceptable path loss in view of system gains. Interference analysis is then performed between sets of links so as to identify mutually independent and mutually exclusive links, i.e., links that do not exclude other links and those that impede the inclusion of other links. Mutually exclusive links are eliminated from the feasible set which is then subject to further selection and optimization to arrive at a preferred network topology.

Alternately, a first high order link analysis is performed, such as by a master radio frequency (RF) planning tool, which analyzes all links possible between an identified group of network node sites (transmitter/receiver sites) to determine a potentially usable subset of all possible links. This subset of all possible links identifies links suitable for establishing communication between all identified network node sites. This subset of links is optimized by excluding links not meeting a first order criteria and includes links which do meet first order criteria.

In this embodiment, the first order criteria is established according to a simple set of design rules adapted to allow the master RF planning tool to analyze a large number of mutually interfered radio links, i.e., all links possible between an identified group of network node sites, without requiring excessive processing resources and/or excessively long analysis times. Such design rules may be derived by reducing the number of parameters considered in this first order analysis, such as by analyzing the links in only two dimensions and/or by establishing particular design threshold parameters and simplified link modeling data. Accordingly, a manageable number of rules for the possible link situations may be identified and applied to a very large number of possible links to include and/or exclude links from the potentially usable subset of links.

The subset of links determined by the master RF planning tool may be further optimized by selection of the most preferred links of alternative link paths determined suitable for establishing communication between all identified network node sites which meet the first order criteria. Accordingly, parameters such as link distance, number of link hops between particular nodes, average number of link hops between subscriber nodes and service provider point of presence nodes, and the like may be used in selecting particular links of the subset of links where multiple ones of all of the possible links are determined to meet the first order criteria.

After a first order analysis of the possible links has been concluded, providing a potentially usable subset of links, a second order link analysis is performed, such as by a radio link design tool, which analyzes links of the first order subset of links according to a more detailed analysis than that of the master RF planning tool in order to more accurately determine the suitability of each of these potentially usable links for communication services. Specifically, the radio link design tool takes into consideration link parameters which were not considered in the first order analysis. For example, where the master RF planning tool analyzes links only in two dimensions, such as by implementing the aforementioned preferred embodiment set of design rules, the radio link design tool may provide a three dimensional analysis of the links of the subset of links. Likewise, this second order analysis may utilize more sophisticated and more complicated link modeling data to more accurately analyze links of the subset of links for their suitability in providing the desired quality of communication. In this embodiment, the radio link design tool analyzes links of the subset of links to determine if propagation in free space is likely to provide desired communication signal quality or if such propagation is impeded, such as by a building or other terrain feature of the deployment region blocking the line of sight, causing intolerable multipath conditions, or the like. Accordingly, the radio link design tool may determine that particular ones of the links of the subset of links are unsuitable for use in providing communication at a desired quality level.

If the radio link design tool determines ones of the links of the subset of links are unsuitable for use in providing communication at a desired quality level, the present invention preferably removes this, or these, particular links from the group of all possible links in the master RF planning tool. Thereafter, first order analysis may again be performed which analyzes all remaining links between the identified group of network node sites to determine another potentially usable subset of all possible links. This subset is then preferably analyzed according to the second order analysis as described above. In this embodiment, this sequence of first and second order analysis is performed until the subset of links is found to include links suitable for use in providing the desired communication quality.

After the second order analysis has determined that links of the subset may be utilized to provide the desired communication quality, a communication network system is deployed, altered, or expanded to provide links according to the results of the first and second order analysis described above. Communication is preferably established over these deployed links, such as initially in a commissioning phase, to provide a third order analysis in the form of empirical field verification. Such field verification may include the operation of communication equipment of the links of the network system to provide worst case operation scenarios to confirm communication signal quality levels provided under such conditions. Additionally or alternatively, field verification may include analyzing communication parameters at various ones of the links during communication of signals at other links of the network in order to determine the actual mutual interference experienced.

The field verification information derived from such analysis is used in updating the master RF planning tool and/or the radio link design tool of the present invention. For example, if particular links are discovered to provide communication quality less than that desired, these particular links may be removed from the possible links in the master RF planning tool. Similarly, data relevant to accurately modeling the links of the network, such as link degradation due to topological anomalies or mutual interference caused by multipath conditions, may be provided to the radio link design tool for more accurate determination of links useful in providing the desired communication quality.

In this embodiment, a fourth order analysis is provided in the way of in-service analysis of the links. It shall be appreciated that although referred to herein as fourth order analysis, the in-service analysis may be provided in lieu of third order field verification as well as in addition to field verification. The in-service analysis of the links monitors link parameters during normal use of the links. Such parameters may include link quality measurements, such as a bit error rate, carrier to interference ratio, signal to noise ratio, link outage times, and/or the like, as well as operating parameters of interest, such as receive signal strength, transmission power level, traffic loading, and/or the like.

This in-service information is used in updating the master RF planning tool and/or the radio link design tool of the present invention. For example, link quality measurements may be utilized in providing the above mentioned optimization of the links selected as the subset of links by the master RF planning tool. Additionally or alternatively, in-service information may be utilized by the radio link design tool to more accurately model the links of the networks.

An embodiment of the present invention provides for the ability to build out the communication network, i.e., expand an initially deployed communication network by adding additional links to newly served nodes, by not only considering currently desired links, but also by considering future links. According to this embodiment, the identified group of network node sites analyzed according to the present invention includes at least two categories for grouping of network node sites; installed node sites and future node sites. By including not only the installed node sites in the link analysis but also the future node sites, the links which are currently established may be adapted to easily accept the addition of links of the future node sites as demand increases.

Another embodiment of the present invention further breaks down the future node site category described above to include an upcoming node site category and a potential node site category, to thereby include at least three categories for grouping of network node sites. Accordingly, this embodiment of the present invention provides a hierarchy of future node sites to both allow for consideration of all potential future node sites in the link analysis of the present invention as well as to allow for efficient detailed analysis of a reduced number of links associated with higher precedence links as identified by the further node site hierarchy.

Utilizing a hierarchy of links, such as provided by the future node site hierarchy of the embodiment described above, an embodiment of the radio link design tool does not perform the second order analysis on all links of the subset of links provided by the first order analysis. Instead, the radio link design tool provides its detailed level of analysis only on those links of the subset of links which are most likely to actually be placed into service. For example, where the node sites are categorized as installed node sites, upcoming node sites, and potential node sites, the radio link design tool may perform detailed analysis only on those links associated with installed node sites and upcoming node sites, i.e., those nodes actually installed and those nodes scheduled for service in the future. Accordingly, potential node sites, i.e., those sites suitable for providing network communication thereto and/or those sites meeting some minimum threshold criteria such as a business location currently utilizing an identified minimum communication resource, may be omitted from this more resource demanding level of analysis.

Although the more detailed level of analysis is omitted with respect to particular ones of the links in this embodiment, it should be appreciated that these links have not been entirely omitted from the analysis according to the present invention. Specifically, the embodiment with the master RF planning tool of the present invention provides an analysis on every link possible for all identified node sites, whether they be installed, upcoming, or potential. Analysis of every possible link of this potentially large number of node sites is economically provided according to this embodiment in part due to the set of design rules utilized by the master RF planning tool embodiment, which will provide a good indication of links associated with the potential node sites which will not provide the desired communication quality level.

Another embodiment of the present invention identifies a distributing node site of the node sites to handle a large number of radio links. Analysis according to the present invention may be utilized to determine a maximum number of links possible from such a distributing node site in order to provide for the efficient communication between a large number of radio links and this distributing node site. Such an arrangement is especially useful in situations where communication services are being provided by a service provider, such as a competitive local exchange company (CLEC) or Internet service provider (ISP), through a single switch center or point of presence (POP) which may be coupled to the communication network through the distributing node site.

Additionally, a plurality of such distributing nodes may be utilized to provide back hauling or concentration of communications between a central point, such as the above mentioned switch center or POP, and a large number of nodes of the network and/or nodes of the network which are distributed over a large geographic area. For example, geographic regions may be established wherein the node sites of each geographic region are coupled to a distributing node associated with that particular geographic region for communication with a switch center or POP serving the geographic regions.

Another embodiment of the present invention is a methodology of designing an automated RF planning tool which includes incorporating criteria, such as RF characteristics and potential interference, to determine the desirability of wireless links between possible radio nodes. This methodology also includes the elimination of potential wireless links between radio nodes based on these criteria and the determination of a preferred topology by examining the reduced number of wireless links to be considered. The potential links may be classified as mutually independent or mutually exclusive based on those interference considerations and environmental factors may be included in the determination of the preferred topology.

Accordingly, it is a technical advantage of the present invention that links of a network communication system are analyzed to provide a deployment of links adapted to readily accept future expansion of the network. A further technical advantage of the present invention is realized by the analysis of radio links of the network system include not only installed links and planned upcoming links, but also all potential links between network node sites meeting particular criteria.

It is a still further technical advantage of the present invention that utilization of resources in providing the analysis of communication links is economized through the use of hierarchies of node sites or links in order to allow analysis of all potential links without necessitating excessive resources in providing detailed analysis of such links.

By utilizing a simplified set of link design rules, analysis on a very large number of links, such as the an embodiment which performs an analysis of all possible links between the identified node sites, is possible economically, thus providing a yet further technical advantage.

A further technical advantage of the present invention is provided through the use of multiple orders of analysis of links to efficiently utilize resources as well as to confidently provide communication network link planning to meet desired communication quality levels. Moreover, a technical advantage is provided in that optimization of links is provided through interaction of ones of the multiple orders of link analysis.

A still further technical advantage is realized by the use of the present invention to provide a large or maximum number of links from a particular node site, such as may be designated a distributing site, in order to couple a large number of network node sites to a particular service. This technical advantage may be further compounded by the use of multiple ones of these distributing sites to couple larger numbers of node sites and/or geographically disbursed node sites to such a service.

A still further technical advantage of the present invention is the use of geometric relationships between the radio node sites to eliminate links from further consideration. This advantage is obtained through a multi-step process in which all possible links are identified, these links are classified by their geometric relationship, interfering links are eliminated, topologies are identified which allow communications between all radio sites and a favored topology is selected.

A still further technical advantage of the present invention involves the simplification of complexed interference calculations to enable simplified derivatives of acceptable results through table look ups.

A further technical advantage is to provide the planner the ability to include environmental propagation considerations involving rain and storms in their planning.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION

Communication through transmission of radio frequency (RF) signals is often a desirable medium for establishing desired data communication. For example, high frequency high bandwidth wireless communication has been provided through the use of point-to-point radio systems, such as point-to-point microwave radio transmitters and receivers providing line of sight communications. However, such RF propagation is undetectable to the human senses, i.e., invisible, and is generally through free space thus resulting in difficulty in identifying its path or paths, controlling its attributes both in areas where propagation is desired and areas where propagation is undesired, and providing for multiple discrete communications via a common radio frequency.

Figure 1:
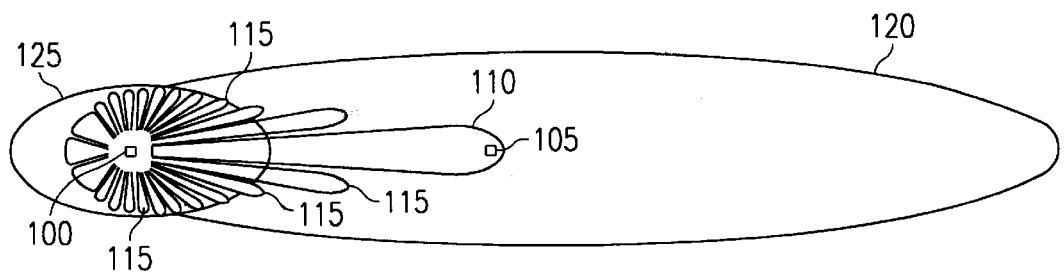
FIG. 1 illustrates a typical far field radiation pattern of a directional wireless link.

Directing attention to FIG. 1, a transmitter/receiver pair, such as may be embodied in the above described point-to-point microwave radio system, adapted for providing RF data communication is shown as transmitter 100 and receiver 105. Also shown in FIG. 1 is a graphical plot of the far field radiation pattern associated with propagation of an RF signal from transmitter 100. Shown is main antenna beam 110 which is directed from transmitter 100 to receiver 105 and identifies the area in which the propagation of a signal transmitted from transmitter 100 has attributes suitable for the desired data communication, i.e., the signal strength is sufficient to provide an adequate received signal over thermal noise. However, as directional antenna designs are generally not perfect, also shown in FIG. 1 are antenna sidelobes 115, which may include not only sidelobes but back lobes, grating lobes, and the like, which are oriented in directions other than in the direction of the main antenna beam 110. These sidelobes define areas in which the propagation of a signal transmitted from transmitter 100 also has attributes suitable for data communication, although not actually desired.

In addition to the main antenna beam and sidelobes shown in FIG. 1, exclusion areas 120 and 125, associated with main antenna beam 110 and sidelobes 115 respectively, are also present. These exclusion areas, although associated with propagation of a signal having attributes generally insufficient to establish desirable data communication, are associated with propagation of an RF signal from transmitter 100 at sufficient levels to cause interference with a receiver of another transmitter/receiver pair operating at a same radio frequency to suggest such additional receivers should be excluded from this area.

Presently, one desiring to establish point-to-point communications references a record of all the sites currently established using such microwave communications, and determines where a new link may be established which does not interfere with or receive interference from these established links. This has generally been acceptable where link deployment is scattered. However, it can easily be appreciated from the radiation patterns illustrated in FIG. 1 that such piece meal deployment of radio links, without consideration for future growth, can easily preclude the placement of later desired links. For example, where the transmitter/receiver pair of FIG. 1 are disposed miles apart, the exclusion areas associated therewith become quite large and have the potential of preventing the addition of an additional radio link at a desired location. Accordingly, the above described technique for deployment is not well suited for mass deployment of such radio links, such as is useful in the metropolitan area wireless networks shown and described in the above referenced patent application entitled COMMERCIAL NETWORK TOPOLOGIES UTILIZING POINT TO POINT RADIOS.

Currently when deploying multiple links, a highly skilled engineer performs a manual process to provide the best set of radio links or radio topology once the nodes and radio sites have been identified. In the first step, the designer enters radio site location into a RF tool such as PATHLOSS, EDX, etc. These RF tools identify the RF properties of the radio site locations. Next, the designer, based on their experience, places the radio links, the links which join the radio sites, into the system. Radio links are selected to minimize the interference between other radio links. Next, RF tools performance computations are run which determine the performance of each of the radio links and the mutual interference levels between radio links. Once the performance and interference are identified the engineer decides which links are acceptable and which links should be eliminated from further consideration. Once the unacceptable links and other links selected by the engineer are eliminated, the RF tools performance computation are run again to determine the overall characteristics of the radio topology. This iterative process is repeated until the engineer is satisfied with the layout.

The degree of difficulty in selecting an acceptable radio topology is proportional to the square of the number of links in the network. For example, if n represents the number of radio sites in a metropolitan area, then the number of possible links to join n nodes is $n(n-1)/2$. Additionally, the number of radio links which is necessary to connect n radio sites is $n-1$. The possible topology having $(n-1)$ links n nodes is equal to the binomial coefficient $(n(n-1)/2, (n-1))$. For example, if a network has two nodes then there is only one link to join these two nodes together and there is only one possible topology. Similarly, when there are four nodes in a network three links are required to join these four nodes together. Now there are twenty possible topologies which will join these four nodes by three links. One of ordinary skill in the art will understand that the number of possible topologies increases in $n^2$ while the number of desired links increases in n. For seven radio sites or nodes, six links are necessary and there are 54,264 possible topologies which contain six links connecting the seven nodes.

As the number of nodes increases a brute force, or exhaustive search, to find the best topology becomes impractical if not impossible. This problem becomes exacerbated when the engineer must also consider different operating conditions such as losses due to rain attenuation and differentiate pathloss, etc. Differentiate pathloss is the pathloss difference between two paths and may exist when a single receiver is in both a signal path and in an interference path of another receiver.

The present invention provides an automated radio network planning tool that can automatically support a planned mass deployment of communication links in an area, such as a metropolitan area, to provide for the desired location of links without restricting the ability to locate other links where necessary or desired. Accordingly, the preferred embodiment of the present invention provides for the ability to build out the communication network by not only analyzing existing and currently desired links, but also analyzing future links. Through such analysis, present deployment of communication links may be initially established that not only serve current needs, but avoid the above mentioned preclusion of adding additional links in the future.

This automated radio network planning tool provides a number of benefits. An engineer using the automated radio network planning tool could include future site projections in anticipation of future needs in the system. The inclusion of these future projections and needs ideally will allow system growth without requiring changes to the installed base or the topology and without service interruption in the future. Additionally, network density may be increased because the automated radio network planning tool has the ability to effectively search through all topologies. Furthermore, the use of this automated radio network planning tool reduces the RF engineering skill required to plan the position of radio nodes and the system incorporates the expertise required. Finally, the present invention reduces overall interference in the system.

Identification of a network topology for implementation is preferably an iterative multi-step process in which possible links between various nodes of an RF network are selected, or conversely eliminated. Various criteria can be used in determining link selection or the elimination of specific links. Preferably, the iterative multi-step process encompasses additional detail, or more stringent criteria in selecting or eliminating links in the latter steps of the process. The identification of an optimized network topology can be accomplished during the first iteration or after successive iterations.

Figure 2:
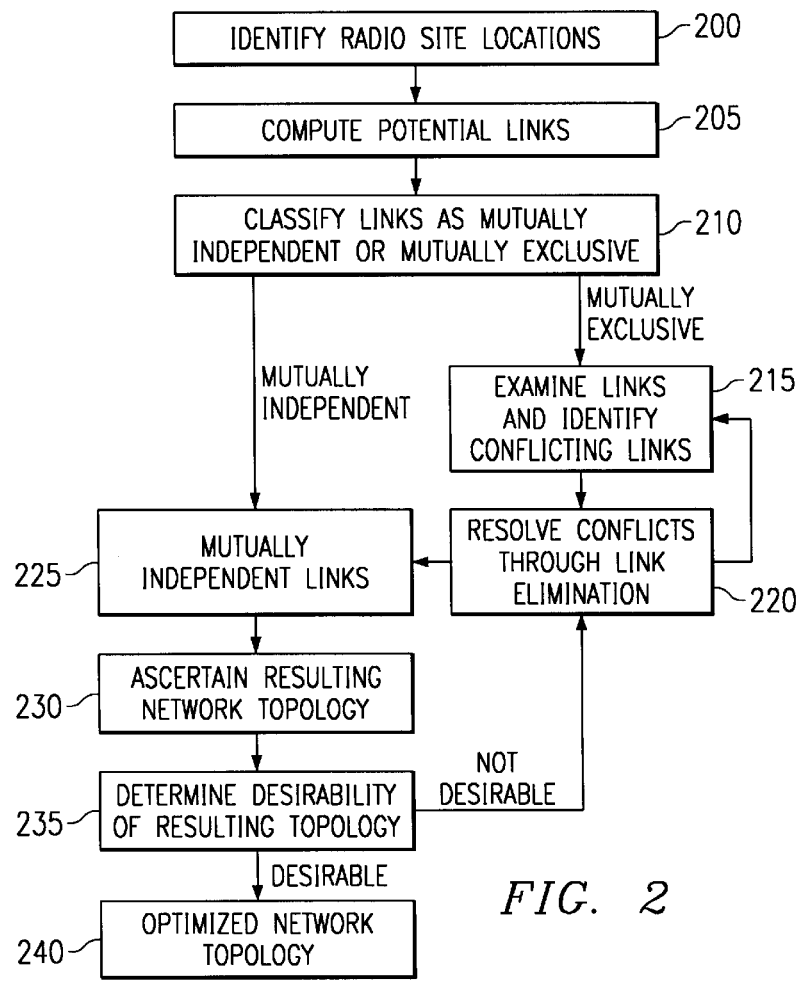
FIG. 2 is a flow diagram of a preferred embodiment of the multi-step process of the present invention.

Referring to FIG. 2, the radio site locations are first identified at step 200. The radio site locations, also known as node sites, can include existing, currently desired, and/or future node sites. The radio site locations utilized may be identified according to the present invention in a hierarchy, such as the aforementioned currently desired and future node sites as well as other useful categories including a type of node site (customer node, service provider node, distributing node, etc.), a communication demand expected at that site, a quality of service guaranteed at that site, and/or the like.

The inclusion of potential future nodes according to the preferred embodiment provides for future growth. Preferably the potential future node sites include all presently identifiable node sites meeting particular criteria. For example, where the communication network is to provide high bandwidth data communication, such as shown and described in the above referenced patent application entitled COMMERCIAL NETWORK TOPOLOGIES UTILIZING POINT TO POINT RADIOS, all known locations with a service region meeting a selected threshold criteria, such as any office building having six T1 subscribers located therein, may be identified as potential future nodes. Of course other criteria may be utilized in addition to or in the alternative to the above. For example, buildings of particular sizes, companies having particular numbers of employees, businesses conducting particular types of business, locations of expected future growth (although currently not meeting a selected criteria or even having any building or infrastructure located thereon), and the like may be utilized as criteria to identify potential future node sites.

Referring again to FIG. 2, at step 205 potential links (i.e., edges) are computed which may be used to connect the various nodes of the RF network. This process begins with the identification and consideration of all potential links in which communications may be established throughout the network between and among the various radio node sites. Links which include less desirable characteristics are also identified and may be used as alternate links where use of a favored link is not undertaken because its use would otherwise preclude establishing a link between additional network node sites. Similarly, particularly desirable links, such as those associated with a particular node, such as a service provider node, a distributing node, or a node having particular quality of service or communication bandwidth demand, may be identified and may be used as favored links and/or to identify alternate or less desirable links (such as links which would interfere with the more desired links). The computation of the potential links is accomplished by the determination of the practicably realizable links, i.e., those links which are within the effective range (including path loss considerations) and within line of sight.

An interference analysis is then performed between sets of potential links to identify promising links by the identification and elimination from further consideration of less promising links. This identification begins with the classification of potential links as mutually independent or mutually exclusive links at step 210. Mutually independent links are defined to be those potential links whose inclusion in the network topology would not require the exclusion of any other potential link in the network topology. Mutually exclusive links are defined to be those potential links whose inclusion in the network topology would require the exclusion of other potential links in the network topology. In other words, mutually exclusive links are in contention with each other for inclusion in the optimized network topology. Mutually independent links can also be identified by those links in which the signal carrier to interference level is larger than the manufacturing performance specification of the radio. Similarly, mutually exclusive links may be identified by those links in which the signal carrier to interference level is less than, or equal to, the manufacturing performance specification of the radio.

As further explained below, the mutually exclusive links are then examined at step 215 to determine which mutually exclusive links are necessary and should be included within the network topology and which potential links are, because they conflict with the included link, eliminated in step 220 from use within the network topology. Once the conflicting mutually exclusive links are eliminated, the corresponding mutually exclusive links become mutually independent links at step 225. Of course, decisions based on which links of a mutually exclusive link grouping should be eliminated may be made on a number of factors, such as the number of other links becoming mutually independent by the elimination of a particular link, the particular links associated with a node of a particular identification category, such as the links of a distribution node or of a service provider node etc. When a collection of mutually independent links has been identified, they are then examined to ascertain the resulting network topology at step 230 and the desirability of the resulting network topology at step 235. If the resulting network topology is not desirable then an alternate resolution of mutually exclusive links is sought at step 220. This iterative process can be repeated to determine a desired optimized network topology at step 240. Factors to be included in assessing the desirability of a particular topology include maximum path fade, power requirements, network redundancy, provision for expansion by addition of nodes and links, fade margin requirements, topology, cost of installing and maintaining sites, provision of a desired number of maximum number of links to particular nodes, provision of links suitable for delivering a particular quality of service to particular nodes, and other factors. These factors may be assigned weights and a weighted score use to determine if a particular topology is acceptable, better than a previously considered topology, or less desirable and subject to elimination from further consideration. Differential pathloss due to rainfall can also be considered in this calculation.

Figure 3A:
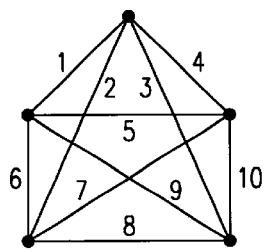
FIGS. 3A through 3C are an example of a process to select a favored topology.
Figure 3B:
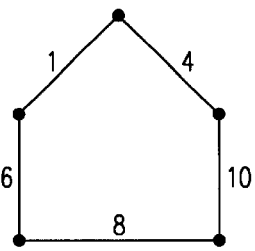
Figure 3C:
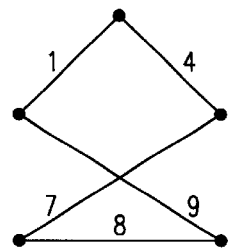

Referring to FIGS. 3A through 3C, an example of an implementation of this preferred embodiment for a network consisting of five node sites is explained. First, the set of nodes within the area under consideration are identified. In FIG. 3A, five nodes have been identified. Next, referring to FIG. 3A, all possible links, 1 through 10, between all pairs of the five radio node sites within the respective effective ranges of the sites (including path loss considerations) and within line of sight are identified. Thus, these ten paths are considered to be potential links. The identification of all potential links from a node can be performed by identifying all target nodes within effective range of the node in question and then ensuring that the line of sight requirements are met. In this example all ten links identified are within the effective range and meet the line of sight requirements.

Next a categorization is made for each potential link as to whether the potential link is a mutually independent link or a mutually exclusive link. One method of making this categorization is with the use of a lookup table which determines the link's classification as a function of the angle between the potential conflicting links. With the use of a suitable table, Links 5, 6, 8 and 10 of FIG. 3A would be categorized as mutually independent links (can be used without restriction) while links 1, 2, 3, 4, 7 and 9 would be categorized as mutually exclusive links. In other words, link 1 or 2 can be used, link 3 or 4 can be used, line 2 or 3 can be used, link 2 or 7 can be used and link 3 or 9 can be used. Use of one link in the pair precludes the use of the other.

Once the mutually independent links and the mutually exclusive links are identified, link selection criteria is used to identify an optimized set of links for further consideration. One method of performing this task is that the mutually exclusive links are examined to identify not only the conflicting links, but also how the elimination of specific links in the network topology would eliminate conflicts. One method of performing this task is through the use of Table 1.

TABLE 1

| Link | Potentially Conflicting Links |
|---|---|
| 1 | 2 |
| 2 | 1, 3, 7 |
| 3 | 2, 4, 9 |
| 4 | 3 |
| 7 | 2 |
| 9 | 3 |

Table 1 is formed by the creation of a row for each mutually exclusive link (i.e., links unable to coexist with one or more other links) and the listing of that mutually exclusive link in the left hand column. The second column is generated by determining each potentially conflicting link to the link in question and entering it into the second column of the appropriate row. Once the table is generated, one type of selection criteria is to eliminate the mutually exclusive link which has the largest number of conflicts, as identified by Table 1, with other links. The remaining links are then examined to determine if all remaining mutually exclusive links are now independent. If there are still mutually exclusive links, an additional mutually exclusive link is selected, again by the number of conflicting links, and eliminated. This procedure is repeated until each remaining link is mutually independent. This method reduces the computations necessary to identify the preferred topology.

Alternately, links can be eliminated by observation. In Table 1, it may be determined that the elimination of links 2 and 3 would eliminate all possible conflicts between potential links. With these two potential links eliminated, links 1, 4, 5, 6, 7, 8, 9, and 10 are now mutually independent links.

Alternatively, mutually exclusive links can be eliminated, one link at a time, to identify the most promising topology. Additional optimization steps can eliminate, if necessary, multiple mutually exclusive links, or investigate the elimination of various pairings of the mutually exclusive links. User interaction can also be incorporated in the selection of the links to be eliminated.

Other link selection criteria may also be used to identify an optimized network topology. For example, a more rigorous technique may include the ordering of links to identify those excluding the greatest number of other links. These links are eliminated and the remaining links reordered until all mutually exclusive links are eliminated. An example of a greedy algorithm for eliminating mutually exclusive links is presented in connection with Table 2. In that array, links interfering with other links are designated by the number "0," while links that can coexist without mutual interferences have the number "1" indicated at the appropriate table entry. Summing the entries gives an indication of the number of links the designated link can coexist with (including itself). Thus links having the greatest number of interference problems are identified by having the lowest sums shown along the bottom now labeled "total." Links having the lowest totals may be eliminated to reduce the number of interfering links possibilities.

TABLE 2

|  | 1 | 2 | 3 | 4 | 5 | 6 | 7 | 8 | 9 | 10 |
|---|---|---|---|---|---|---|---|---|---|---|
| 10 | 1 | 1 | 0 | 1 | 1 | 1 | 0 | 1 | 0 | 1 |
| 9 | 1 | 1 | 0 | 1 | 0 | 0 | 1 | 0 | 1 | 0 |
| 8 | 1 | 1 | 1 | 1 | 1 | 1 | 0 | 1 | 0 | 1 |
| 7 | 1 | 0 | 1 | 1 | 0 | 0 | 1 | 0 | 1 | 0 |
| 6 | 1 | 0 | 1 | 1 | 1 | 1 | 0 | 1 | 0 | 1 |
| 5 | 0 | 1 | 1 | 0 | 1 | 1 | 0 | 1 | 0 | 1 |
| 4 | 1 | 1 | 0 | 1 | 0 | 1 | 1 | 1 | 1 | 1 |
| 3 | 1 | 0 | 1 | 0 | 1 | 1 | 1 | 1 | 0 | 0 |
| 2 | 0 | 1 | 0 | 1 | 1 | 0 | 0 | 1 | 1 | 1 |
| 1 | 1 | 0 | 1 | 1 | 0 | 1 | 1 | 1 | 1 | 1 |
| Total | 8 | 6 | 6 | 8 | 6 | 7 | 5 | 8 | 5 | 7 |

Identification of interfering links may be accomplished using various criteria, ranging from advanced simulation tools to relatively simple schemes referencing proximity of links to identify interference problems. Because the present invention includes an initial step of "paring" down the list of a larger number of candidate link combinations and permutations, an algorithmically simple approach is dictated. Thus, link pairs may be considered to interfere with one another (mutually exclusive) if link paths form an angle of less than a predetermined minimum angular resolution, e.g., 30, 45, 60, or 90 degrees, depending on other factors such as antenna resolution, link density, etc. Other link selection criteria may include, but is not limited to, optimal margin, signal-to-noise angular separation between sites and maximum path diversity optimum path criteria.

The next step in this iterative process is for the five radio node sites to be interconnected to the extent possible using a combination of the mutually independent links. FIGS. 3B and 3C show two methods in which this can be accomplished. The final step is a decision between the alternate possible configurations by considering future expansion. For future expansion consideration, link angles in multiples of 10 degrees are desirable. FIG. 3B would be selected for implementation. Note also that paths 7 and 8 of FIG. 3C have marginal angular diversity as do paths 8 and 9. One skilled in the art would understand that the individual steps detailed above can be combined or separated in numerous ways.

While the five radio node site example illustrates how tables can be used to categorize potential links as either mutually independent links or mutually exclusive links, one skilled in the art would understand the increased complexity numerous radio node sites would entail. Preferably, simplification of the table used for categorizing the links would assist the planner in link selection.

The table analysis used is based on a two potential link analysis and is repeated, as necessary, to examine each potential link in the network topology. Referring to FIGS. 4A–4D, the two link analysis involves a first transmitter located at radio node 405 and a first receiver located at radio node 410. A second transmitter is located at radio node 420 and a second receiver is located at radio node 415. As described previously, when a first transmitter 405 transmits a first signal to a first receiver 410, the second receiver 415 may also receive the signal transmitted by the first transmitter 405. Similarly, when the second transmitter 420 transmits a second signal to the second receiver 415, the first receiver 410 may also receive the second signal as interference. If both the first and the second transmitter are transmitting at the same time (as is typically the case), the second signal the first receiver receives from the second transmitter interferes with the first signal it is trying to receive from the first transmitter.

The link analysis is concerned with the received signal level (the first signal) and signal to interference level (second signal). If the interference is too great, the received signal has an inadequate signal to noise ratio to recover the information being transmitted. Typically, link budget equations are used to determine the signal to interference levels. These link budget equations can be expressed as three equations, as follows:

> Received signal power=transmit power−pathloss+transmit and receiver antenna gain>the receiver sensitivity   1.

Figure 4A:
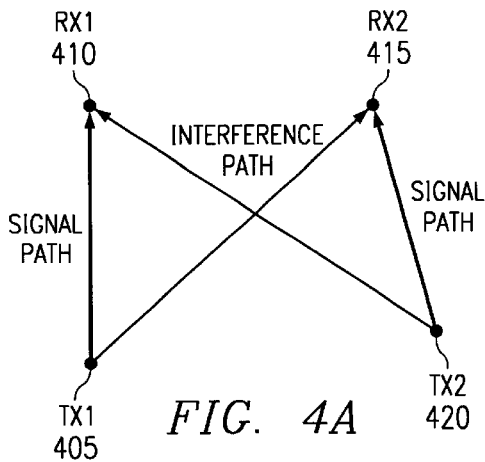
FIGS. 4A through 4D is a graphical representation of various configurations of two link analysis.

Referring to FIG. 4A, the received signal power at the first receiver 410 is equal to the transmitted power of the first transmitter 405 minus the pathloss (the loss of the signal due to environmental factors along its path from 405 to 410) plus the gains attributable to both the first transmitter's antenna gain and the first receiver's antenna gain. In order for the first receiver to demodulate this signal, the received signal power must be greater than the first receiver's gain, i.e., its sensitivity.

> Interference power=Interfering transmit power−interference pathloss+transmit and receiver antenna gain at the direction of interference path direction−frequency discrimination−polarization discrimination   2.

Referring to FIG. 4A, the power level due to interference the first receiver 410 will receive from the second transmitter's 420 transmission is equal to the second transmitter's transmission power minus the pathloss (the loss of the signal due to environmental factors along its path from 420 to 410) plus the gains attributable to both the second transmitter's antenna gain and the first receiver's antenna gain minus any losses due to either frequency discrimination (differences between the first transmitter's and the second transmitter's transmission frequencies) and losses from efforts to reduce interference through polarization diversity.

> Received signal power/Interference power>required S/I   3.

The signal to interference ratio is the power of the received signal from the first transmitter at the first receiver's location divided by the power of the interference from the second transmitter at the first receiver's location and must exceed a minimum required signal to interference ratio.

If all pertinent conditions are known, the link budget equations can be used to calculate the required signal to interference ratios, but the number and complexity of the calculations make the cost of the calculations infeasible. Preferably, a look-up table would categorize the various two link combinations to eliminate or classify the configuration without the need of calculating each signal to interference ratio. However, the size of the table required to contain various distances and angles between transmitter and receiver, and the various pathloss and antenna gain combinations, makes the use of a table impractical. The invention addresses this problem by using a look-up table based on simplified link budget equations or a limited number of design rules. This look-up table can then be used to categorize links as mutually independent links or mutually exclusive links.

The antenna gain variables in both the received signal power and the interference power equations can be simplified by replacing them with the applicable averaged, worst case or typical constants. In the received signal power equation, since the receiver is placed within the main beam of the transmitter, the antenna gain for both the transmitter and the receiver are equal to the main beam gain with a typical value of 39 dB for microwave systems.

Determining the constant for the transmitter and receiver antenna gains in the interference power equation is somewhat more complicated. Table 3 shows the amount of antenna discrimination versus the antenna angles based on the antenna plot. Table 3 shows that as less antenna discrimination (or off-axis rejection) is required, the restriction on the minimum antenna angle diversity is reduced. For example, to attain 50 dB of antenna discrimination, the receiving antenna's main beam cannot be within the interfering transmitter's main beam, the sidelobe angle must be greater than 60 degrees away but there are no restrictions on interference with sidelobes. This antenna discrimination is a good compromise between a flexible transmitter, a receiver's relative placement and antenna discrimination. Alternatively, at a lesser 40 dB of antenna discrimination, a more flexible orientation of station results, requiring a sidelobe angle of at least 18 degrees and no restrictions on the sidelobe. Conversely, requiring only 40 dB of antenna discrimination results in a system loss of 10 dB of total interference discrimination. Increasing the antenna discrimination to 60 dB complicates the use of tables over the 40 dB or 50 dB cases in that the rules would have to take into account sidelobe considerations.

TABLE 3

| Interfering antenna angles In degrees | Antenna discrimination | | | |
|---|---|---|---|---|
| | 40 | 50 | 60 | 70 |
| | Victim antenna angles in degrees | | | |
| Main beam 0–5 | No main beam >18 sidelobes | No main beam >60 sidelobes | No main beam >80 sidelobes | No main beam |
| Sidelobes 5 to 180 | No restriction on Sidelobes | No restriction on Sidelobes | Restrictions | Restrictions |

Thus according to the determination of the constants for the antenna gains in the interference power equation for a given antenna discrimination, two links will satisfy the design objective as long as the receiver or transmitter are not in the main beam of the other wherein the main beam is considered to extend to the −3 db contour relative to the antenna boresight. Once it is determined that the links are outside each other's main beam, then the sidelobe angle must be 60 degrees away to obtain a 50 dB antenna discrimination.

The link budget equations can be simplified by replacing the appropriate variables in the equations with the antenna gain constants in both the received signal power and the interference power equations. After making these substitutions, Equations 1 through 3 now become:

> Received signal power=transmit power−pathloss+78 dB>the receiver sensitivity

Where both the transmit and receive antenna gains are equal to the main beam gain which are assumed to be 39 dB each.

> Interference power=Interfering transmit power−interference pathloss+28 dB

Where both the frequency discrimination and the polarization discrimination are assumed to be equal to zero and the transit and receive antenna gain in the direction of the interference path direction is assumed to be 28 dB a typical gain for a microwave antenna.

Received signal power/Interference power>required S/I

The next step in the simplification of the link budget equations is the simplification of the signal power and pathloss variables. Preferably, a link separation requirement is calculated for each given signal path distance. Then, when a signal path distance is known, the link separation requirement can be determined from the corresponding table. Additionally, radio performance parameters and operator determined system parameters are used to complete the tables used to compute the link separation. Radio performance calculations take into consideration such parameters as fixed transmitter power verses Adaptive Transmit Power Control (ATPC) system with predetermined minimum and maximum transmit powers; receiver sensitivity; signal to noise level; data rates, bandwidth, encoding, error detection and correction, and operating frequency. The operator or designer also determines system parameters including: path loss factors such as rain region and rain pattern (discussed below), required minimum link availability and signal to interference ratio.

For example, assume a radio having the following radio performance parameters: ATPC with a maximum transmit power of 27 dBm and minimum transmit power of −23 dBm; receiver sensitivity=−72 dBm; S/N=20 dB; and operating frequency=38 GHz; and the following system parameters: rain rate climate region D (temperate, continental); maximum rain fade for maximum hop distance is 40 dB; rain pattern model used includes one main signal path and two interference paths each subject to one half of the rain fade value of the main signal path; link availability=99.999% and required link margin expressed as signal to interference ratio>30 dB. Results expressed as link separations are given by Table 4.

Alternatively, if a radio has a constant transmitted power and the following radio performance parameters: receiver sensitivity=−72 dBm; S/N=20 dB; and operating frequency= 38 GHz; and the following system parameters: region D; rain fade for maximum hop distance is 40 dB; rain pattern model used is that one signal path and two interference paths has half of the rain fade value of one signal path; link availability=99.999% and signal to interference ratio>30 dB; the resulting table changes substantially and the interference path is equal to the longer of the two signal paths as shown in Table 5.

TABLE 5

Constant Power

| One of the Longer signal path | Interference Path |
|---|---|
| 1 | 1 |
| 0.9 | 0.9 |
| 0.8 | 0.8 |
| 0.7 | 0.7 |
| 0.6 | 0.6 |
| 0.5 | 0.5 |
| 0.4 | 0.4 |
| 0.3 | 0.3 |
| 0.2 | 0.2 |
| 0.1 | 0.1 |
| 0.05 | 0.05 |

Table 5 can also be used to calculate the length of the normalized interference path. For example, referring to FIG. 4B, if the length of the normalized signal path from the first transmitter 405 to the first receiver 410 is 0.5 and the length of the normalized signal path from the second transmitter 420 to the second receiver 415 is 0.9 (the longer signal path), the constant power table, Table 5, gives the length of the normalized interference path as 0.9D.

Table 4 and Table 5 show the link separation, or normalized interference path as a function of D, required to achieve

TABLE 4

| Normalized signal path 2 | Normalized Signal Path 1 |  |  |  |  |  |  |  |  |  |  |
|---|---|---|---|---|---|---|---|---|---|---|---|
|  | 1 | 0.9 | 0.8 | 0.7 | 0.6 | 0.5 | 0.4 | 0.3 | 0.2 | 0.1 | 0.05 |
| 1 | 0.32 | 0.3 | 0.29 | 0.27 | 0.25 | 0.23 | 0.2 | 0.18 | 0.15 | 0.1 | 0.07 |
| 0.9 | 0.3 | 0.3 | 0.28 | 0.26 | 0.24 | 0.22 | 0.2 | 0.17 | 0.14 | 0.1 | 0.07 |
| 0.8 | 0.29 | 0.28 | 0.26 | 0.24 | 0.22 | 0.2 | 0.18 | 0.16 | 0.13 | 0.09 | 0.06 |
| 0.7 | 0.27 | 0.26 | 0.24 | 0.23 | 0.21 | 0.19 | 0.17 | 0.15 | 0.12 | 0.084 | 0.06 |
| 0.6 | 0.25 | 0.24 | 0.22 | 0.21 | 0.2 | 0.18 | 0.16 | 0.14 | 0.11 | 0.08 | 0.055 |
| 0.5 | 0.23 | 0.22 | 0.2 | 0.19 | 0.18 | 0.16 | 0.14 | 0.13 | 0.1 | 0.07 | 0.05 |
| 0.4 | 0.2 | 0.2 | 0.18 | 0.17 | 0.16 | 0.14 | 0.13 | 0.11 | 0.09 | 0.064 | 0.045 |
| 0.3 | 0.18 | 0.17 | 0.16 | 0.15 | 0.14 | 0.13 | 0.11 | 0.095 | 0.08 | 0.056 | 0.039 |
| 0.2 | 0.15 | 0.14 | 0.13 | 0.12 | 0.11 | 0.1 | 0.09 | 0.08 | 0.063 | 0.045 | 0.032 |
| 0.1 | 0.1 | 0.1 | 0.09 | 0.084 | 0.08 | 0.07 | 0.064 | 0.056 | 0.045 | 0.032 | 0.032 |
| 0.05 | 0.07 | 0.07 | 0.06 | 0.06 | 0.055 | 0.05 | 0.045 | 0.039 | 0.032 | 0.032 | 0.016 |

Normalized Interference Path

Table 4 is used to calculate the length of the normalized interference path. For example, referring to FIG. 4B, if the length of the normalized signal path 1 (the distance from the first transmitter 405 to the first receiver 410) is 0.5 and the length of the normalized signal path 2 (the distance from the second transmitter 420 to the second receiver 415) is 0.9, Table 4 gives the length of the normalized interference path to be 0.22D. This value and the link angle requirements, as described below, are then used to determine whether the links are mutually independent or mutually exclusive.

the signal to interference ratio of 30 dB. Similar tables are available for other signal to interference ratios.

Figure 4B:
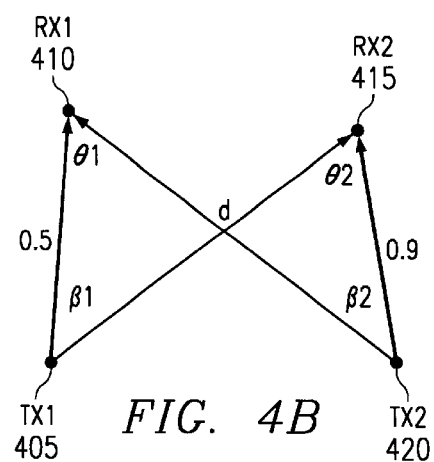

Once the normalized interference path is calculated, the last step in the simplification process for the link budget equations uses a design rule for two links which allows the combination of the link angle requirement and link separation. For example, using Table 4, the ATPC table, above and the two independent links with hop distances of 0.9 and 0.5 of the maximum hop distance respectively, a normalized interference path of 0.22D was calculated. The normalized interference path can now be used with the link angle requirements to determine if the two links are mutually independent of mutually exclusive. For a normalized interference path of 0.22D, Table 6, in conjunction with FIG. 4B are used to make the determination. The use of Table 6 is contingent on the each link meeting the applicable design rules used to calculate the table. Similar tables can be calculated for the implementation of different design rules.

TABLE 6

Mutually independent links

D > 0.22,
β1 and θ2 > 5 degrees OR
β1 < 5 degrees and θ2 > 60 degrees OR
β1 > 60 degrees and θ2 < 5 degrees
AND
β2 and θ1 > 5 degrees OR
β2 < 5 degrees and θ1 > 60 degrees OR
β2 > 60 degrees and θ1 < 5 degrees Now, one skilled in the art would understand that once the coordinates of the transmitter and receiver are known, the use of Table 6 and FIG. 4B allows a determination of whether the links are mutually independent links or mutually exclusive links. If the values of D, β1, β2, θ1 and θ2 fall within the guidelines of Table 6, the links are mutually independent, otherwise the links are mutually exclusive.

Figure 4C:
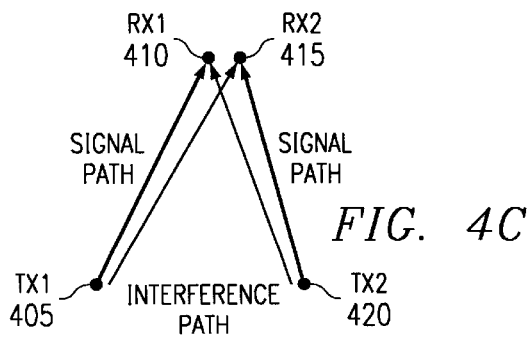

Referring to FIG. 4C, a similar classification technique can be used in a shared node configuration. A first receiver 410 and a second receiver 415 are co-located at a common first node. A first transmitter 405 and a second transmitter 420 are located in different remote locations and are each directed to their respective receivers at the first node. If both transmitter/receiver pairs are ATPC systems, the signals arriving at the receivers should be within 2 dB of each other. Each arriving signal will be a data signal to receiver and interference to the other. Thus the first transmitter's signal will be a signal for the first receiver and interference to the second receiver. Similarly, the second transmitter's signal will be a signal for the second receiver and interference to the first receiver. For a receiver to operate properly, an interference discrimination of 32 dB is required. This discrimination is applicable only to the receiving antenna. This is an interference case from a transmitter main beam to a receiver sidelobes. To achieve the required 32 dB antenna discrimination, an angle of 10 degrees between two signal paths is required.

Figure 4D:
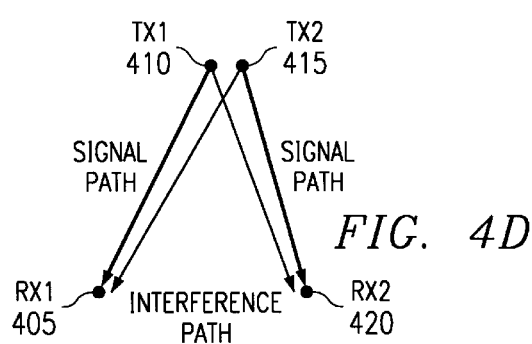

Similarly, referring to FIG. 4D, when two links originate in a single node, antenna discrimination and distance can be used to reduce the interference. As discussed above, for the receiver to operate properly, an interference discrimination, assuming constant rain losses, would be 32 dB between the two links. If rain losses were not constant, an additional 20 dB loss would be assumed, proportionally, along the full pathloss. In this case, with non-constant rain losses the total interference discrimination is 52 dB (32 dB for receiver discrimination plus 20 dB for rain losses). The antenna discrimination gave 32 dB as the same as the links into the HUB. The distance separation between receiver sites 405 and 420 provide the remaining discrimination.

For example, if each of the links have 40 dB rain loss at full distance for both the signal and the interference paths, and the antenna discrimination is 32 dB, Table 7 results:

ADPC

TABLE 7

| Normalized Low Loss Signal Path | Normalized High Loss Signal Path | | | | | | | | | | |
|---|---|---|---|---|---|---|---|---|---|---|---|
| | 1 | 0.9 | 0.8 | 0.7 | 0.6 | 0.5 | 0.4 | 0.3 | 0.2 | 0.1 | 0.05 |
| 1 | V | V | V | V | V | V | V | V | V | V | V |
| 0.9 | V | V | V | V | V | V | V | V | V | V | V |
| 0.8 | V | V | V | V | V | V | V | V | V | V | V |
| 0.7 | V | V | V | V | V | V | V | V | V | V | V |
| 0.6 | V | V | V | V | V | V | V | V | V | V | V |
| 0.5 | X | V | V | V | V | V | V | V | V | V | V |
| 0.4 | X | X | V | V | V | V | V | V | V | V | V |
| 0.3 | X | X | X | V | V | V | V | V | V | V | V |
| 0.2 | X | X | X | X | V | V | V | V | V | V | V |
| 0.1 | X | X | X | X | X | V | V | V | V | V | V |
| 0.05 | X | X | X | X | X | V | V | V | V | V | V |

Where "V" indicates that the 52 dB interference discrimination requirement is satisfied and X indicates that less than the required 52 dB interference discrimination results.

Table 7 can now be used to determine if links are mutually independent or mutually exclusive. For example, referring to FIG. 4B, if the length of the normalized low loss signal path is 0.5 and the length of the normalized high loss signal path is 0.9, a 52 dB minimum interference discrimination criteria is satisfied and the two links are mutually independent. However, if the length of the normalized high value signal path were equal to 1, the minimum 52 dB interference discrimination criteria would not be obtained and the two links would be mutually exclusive. One skilled in the art would realize simplified tables can be generated which represent any desired interference discrimination.

Figure 5:
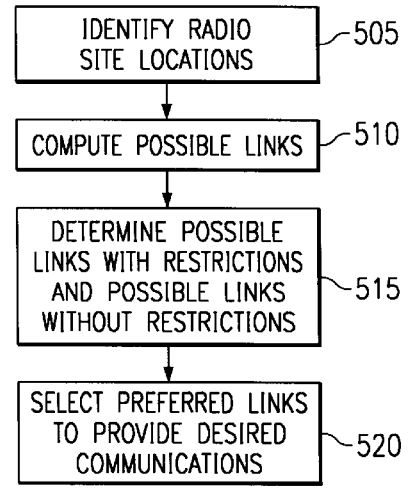
FIG. 5 is a flow diagram of an embodiment master RF planning tool of the present invention.

Another embodiment of the present invention includes, referring to FIG. 5, a master RF planning tool. According to this embodiment, the RF planning tool is used to provide analysis of all possible communication links between network node sites. In order to provide for future growth, the network node sites identified to the master RF planning tool include not only any existing and currently desired network node sites, but also potential future node sites. Preferably the potential future node sites includes all presently identifiable node sites meeting a particular criteria.

Directing attention to FIG. 5, a flow diagram illustrating the steps of RF planning according to an embodiment of the master RF planning tool is shown. At step 505 information regarding the network node sites is provided. As described above, this information preferably includes any installed node sites as well as future node sites. Moreover, as will be better appreciated from the below discussion of the preferred use of a radio link design tool, the information regarding future node sites is preferably further separated into upcoming node sites and potential node sites. The information provided at step 505 may include information, in addition to that mentioned above, useful in establishing desired links. For example, where the links are to provide a communication network allowing subscribers to a service provider resource, such as a switch center or point of presence (POP), such sites may be identified for use in optimizing subscriber links to such shared resources.

Figure 6:
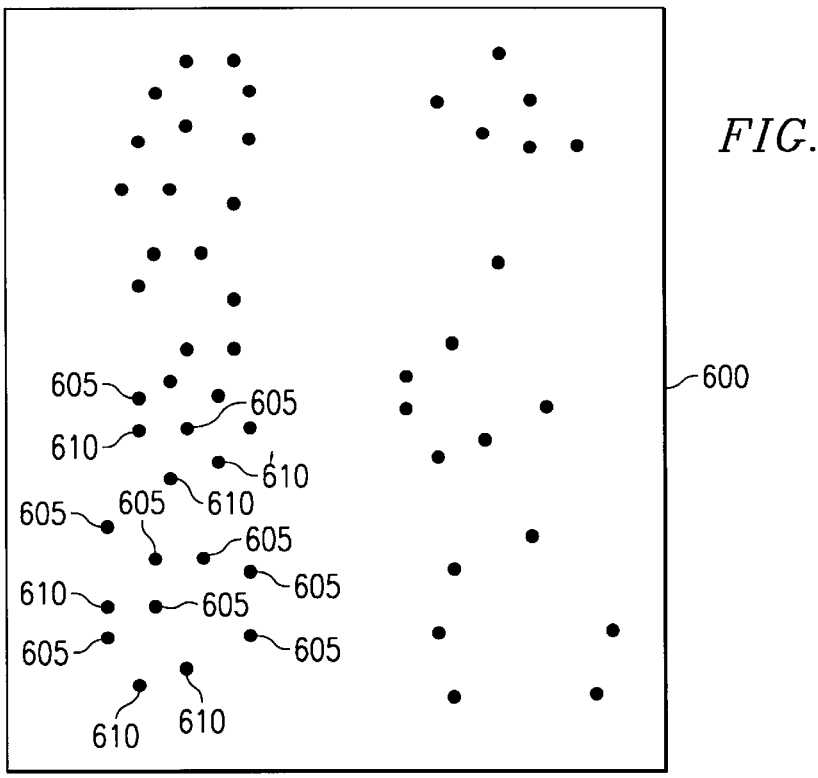
FIG. 6 is a graphical representation of potential radio sites.

Directing attention to FIG. 6, the node site information provided in step 505 is shown in graphical form. Here service region 600, whose shape is arbitrary and is not limited to the rectangular configuration shown, includes a number of identified network node sites. In this embodiment these network node sites are categorized, such as in the above described categories of existing node sites, upcoming node sites, and potential node sites. For example, node sites 605 may be existing node sites, node sites 610 may be upcoming node sites, and the remaining node sites may be potential node sites, such as may be identified as described above.

An embodiment of a master RF planning tool presents this node site information graphically in order to aid an operator in inputting and/or interpreting operation of the master RF planning tool. For example, service region 600 as represented by the master RF planning tool may provide a map of a metropolitan area allowing an operator to utilize a graphical user interface, such as that presented by MICROSOFT WINDOWS or the MACINTOSH OS, to point to and select sites or positions to be identified as network node sites. Additional information input, such as through selection of menu items or keystroke entry, may be utilized by the operator to catagorize node sites, where desired. Of course, other input and output means may be used by the master RF planning tool, such as alpha-numeric input and output indicating relative locations or longitude and latitude of the node sites.

Referring again to FIG. 5, at step 510 this embodiment of a master RF planning tool operates to compute all possible links between the network node sites. This allows the master RF planning tool to determine all possible ways in which communications may be established throughout the network and, accordingly, to determine alternate links where use of a particular link would otherwise preclude establishing a link between additional network node sites.

Figure 7:
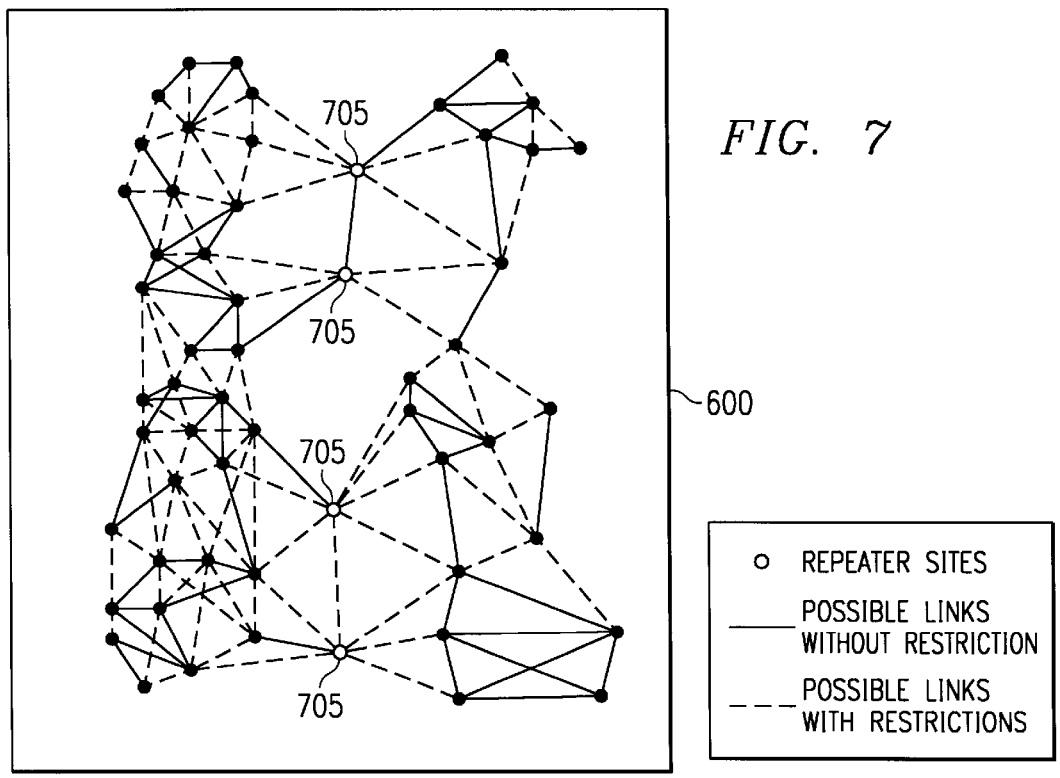
FIG. 7 is a graphical representation of possible links between the potential radio sites of FIG. 6.

Directing attention to FIG. 7, the possible links calculated in step 510 are shown in graphical form. Here, without update information as may be provided in an embodiment by later analysis of the links as will be described in detail below, every link possible between the identified nodes which meet the planning criterial of the master RF planning tool are shown. In this embodiment, the master RF planning tool presents this link information graphically in order to aid an operator in inputting and/or interpreting operation of the master RF planning tool. For example, an operator may be enabled to delete a particular link as a potential link by utilizing the above mentioned graphical user interface to point to and select the link. Similarly, particular links may be selected as preferred or other information associated therewith using such a graphical user interface. Of course, other input and output means may be used, if desired.

It should be appreciated that, depending on the size of the service region and/or the number of network node sites identified, that computation of all possible links between the identified nodes which meet the planning criterial of the master RF planning tool may require extraordinary computing resources. Accordingly, this embodiment of the present invention utilizes a predefined set of design rules adapted to allow for simplified computation of suitable links possible between the identified node sites.

In order to economize the calculation required in this embodiment master RF planning tool, planing criteria is selected which is most helpful, i.e., most generally applicable to links of the network, in determining the potential for establishing links between nodes, ignoring some or all criteria with respect to particular ones of the network nodes (except of course position or relative position information of the nodes). For example, the network nodes may be considered in only two dimensions, ignoring elevational differences between ones of the nodes and/or terrain or structural elevational aspects which may block or impede a link between particular network nodes. Accordingly, a small set of widely applicable design rules may be applied to all of the network node sites to quickly and easily determine possible links there between.

Planning criteria, such as may be reflected in these embodiment design rules, may include information such as a maximum link distance which may be used to provide a desired quality of communication, taking into account such attributes as a rain region service region 600, or portions thereof, is located in. Accordingly, links between identified node sites which exceed such distances may be omitted from the possible links calculated by the master RF design tool. Additionally, line of sight considerations may also allow deletion of possible links calculated by the master RF design tool.

It should be appreciated that such link distance and line of sight limitations may result in a direct link between ones of the network node sites being unsuitable for communication. Where there is a large gap between groups of network node sites of the service region, such as is illustrated by the left and right groupings of network node sites in FIG. 6, particular node sites may be isolated, i.e., no link meeting the design criteria may be indicated, from other ones of the identified node sites.

Accordingly, the preferred embodiment of the master RF planning tool operates to identify repeater sites to aid in providing desired communication links. Of course, where identification of repeater sites may be omitted when isolation of ones of the identified node sites is acceptable, such as when a mass deployment of point-to-point radios is desired rather than a network of wireless links, such as shown and described in the above referenced patent application entitled COMMERCIAL NETWORK TOPOLOGIES UTILIZING POINT TO POINT RADIOS.

Referring again to FIG. 7, repeater sites 705 are shown providing links bridging the gap between the left grouping of network node sites and the right grouping of network node sites. These repeater sites may be identified autonomously by operation of the master RF planning tool, such as by calculating a position of a repeater site to provide repeater links connecting isolated network nodes which do not preclude, or preclude a minimum number of, possible links between the identified network node sites. Additionally or alternatively, operator input, such as at step 505 or at a point in step 510 when the master RF planning tool determines repeater sites are desired, may indicate positions within region 600 which are amenable to repeater sites. For example, an operator may identify locations of particular structures, such as buildings, towers, or even terrain conditions, such as hill tops etc., which may be easily exploited in providing repeater links.

Referring again to FIG. 5, at step 515 the master RF planning tool determines the links of the possible links with restrictions, i.e., the links which can be established only if another link or links of the possible links is not actually employed, and the links of the possible links which do not have restrictions, i.e., the links which can be established irrespective of which of the remaining possible links are actually employed. The results of this determination are shown in FIG. 7 wherein the unrestricted links are shown as solid lines and the links having restrictions are shown as dotted lines.

Figure 8A:
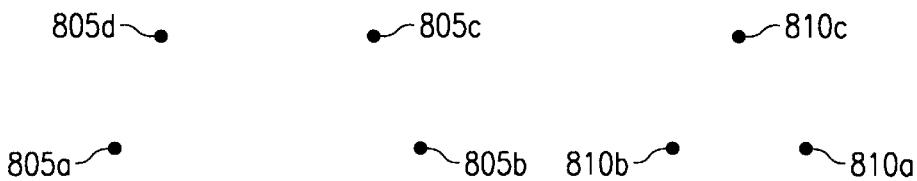
FIGS. 8A through 8D illustrate the restriction of a particular link through improper selection of initial links.
Figure 8B:
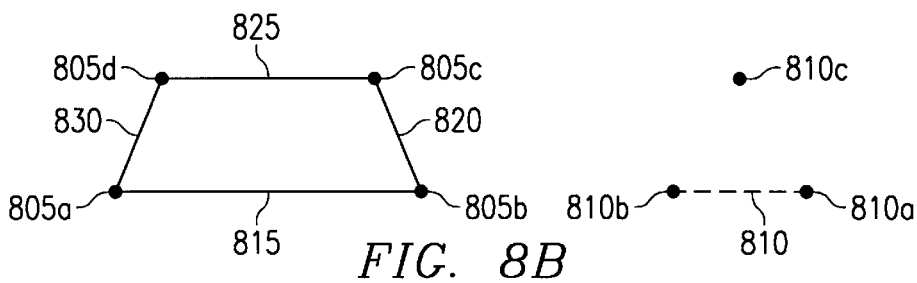
Figure 8C:
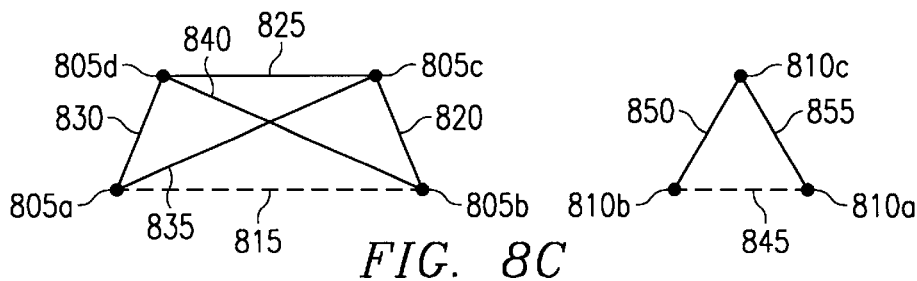
Figure 8D:
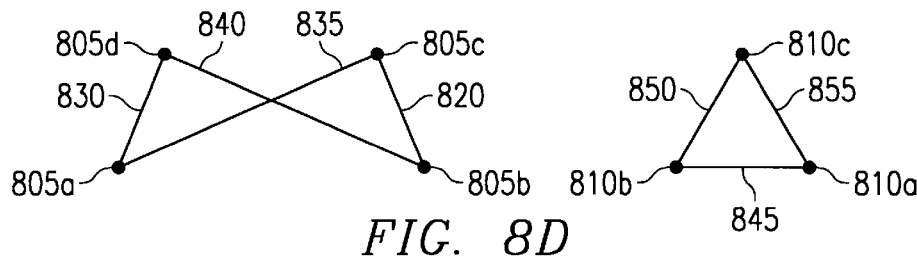

Determination of the possible links and of the links which are restricted in their use is helpful in providing a planning technique which allows for further expansion of the network by later deploying additional links. To better understand how such information is useful in RF planning, attention is directed toward FIGS. 8A through 8D. In FIG. 8A, nodes 805 and 810 are shown. Nodes 805 represent four nodes which desire to establish communication with each other. Likewise, nodes 810 represent three nodes which desire, possibly at some time in the future, to establish communication with each other. However, if the potential for interference between links is not taken into consideration, then one may be inclined to establish links 815–830 between nodes 805 as shown in FIG. 8B, wherein link 815 when directed from node 805a to 805b may preclude future link 845 directed from 810b to 810a. However, by computing all possible links and determining those with restrictions, as described above, the future deployment of link 845 may be provided for without the need for costly reconfiguring of the links between nodes 805. Shown in FIG. 8C are the possible links wherein the links without restriction are shown in solid lines (links 820–840, 850 and 855), and links with restrictions are shown in dotted lines (links 815 and 845). Using this information prior to establishing the links of nodes 805, links may be selected so as to provide the desired communication without precluding the future deployment of links of nodes 810, as shown in FIG. 8D.

It can be appreciated from the simple example shown in FIGS. 8A through 8D that computing all possible links for a large number of network node sites and the determination of those links with restrictions may quickly grow to require substantial computing resources. However, as can be appreciated by the far field radiation pattern illustrated in FIG. 1, there are a number of aspects of the deployment of wireless links which may be represented in design rules having broad applicability to a plurality of nodes utilizing similarly configured communication equipment. Accordingly, an embodiment of the present invention utilizes design rules, which simplify the interference which may be experienced by multiple transmitter/receiver pairs into particular types of interference as may be determined from radiation pattern information such as that of FIG. 1. This embodiment master RF planning tool makes determinations based on the type of interference expected to be experienced in a particular link. Shown below is Table 8 which includes interference types of the design rules of this embodiment master RF planning tool of the present invention.

TABLE 8

| Interference Type | Antenna Direction of Interfering Source | Antenna Direction of Interfered Source | Location of Interfered Source |
| --- | --- | --- | --- |
| 1 | Main Beam | Main Beam | Within the Radio Hop |
| 2 | Main Beam | Main Beam | Far Away from the Radio Hop |
| 3 | Main Beam or Sidelobe | Sidelobe or Main Beam | Within the Radio Hop |
| 4 | Main Beam or Sidelobe | Sidelobe or Main Beam | Outside of the Radio Hop |
| 5 | Sidelobe | Sidelobe | Within the Radio Hop |
| 6 | Sidelobe | Sidelobe | Outside of the Radio Hop |

The above identified types of interference, i.e., main beam to main beam, main beam to sidelobe, and sidelobe to sidelobe, are illustrated in FIGS. 9A through 9F. Specifically, FIGS. 9A through 9F correspond to interference types 1 through 6 respectively, wherein node 905 represents the interfering source, node 910 represents the interfered source, the solid lines represent the main beam link, and the dotted line represents the outer edge of the main beam of node 905.

Figure 9A:
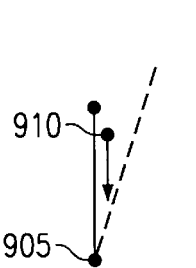
FIGS. 9A through 9F illustrate potential interference scenarios.
Figure 9B:
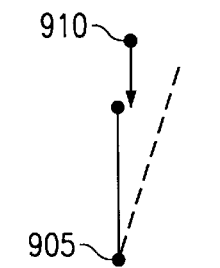
Figure 9C:
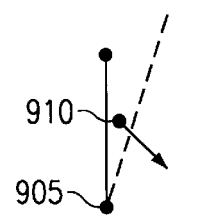
Figure 9D:
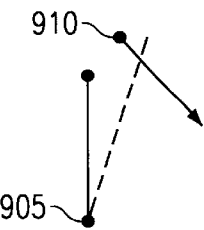
Figure 9E:
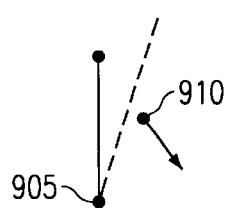
Figure 9F:
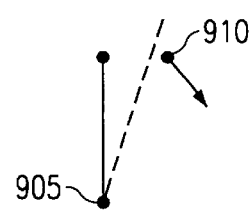

It should be appreciated from the illustration in FIG. 9A that interference type 1 precludes the co-existence of the two radio links operating at a same channel, such as a same frequency division channel, as the main beams are directed at one another in such close proximity that interference will be at an unacceptable level. However, interference type 2, as shown in FIG. 9B, may not preclude the co-existence of the two radio links even through the main beams are directed at one another as the nodes are outside each other's hop distance. Depending upon the direction reuse determined to provide tolerable interference levels, which in a preferred embodiment is ten hop distances between node 905 and 910, interference type 2 may allow co-existence of the two radio links. Accordingly, in a preferred embodiment where the possible link is identified as an interference type 2 link, a simple determination of the distance between nodes 905 and 910 is made and compared to the acceptable link direction reuse.

Determination of the suitability of links having interference of types 3 through 6 is somewhat more complicated than that of interference types 1 and 2 discussed above. In determining whether a link may be relied upon to proved a desired quality level of communication, further information with respect to the communications links is useful. Accordingly, in a preferred embodiment of the present invention, the above identified types of interference are used in combination with information regarding the general attributes of the radiation patterns to determine the potential for a desirable link. For example, in a preferred embodiment, information such as antenna loss at various angles off of the antenna broadside is used with the above interference types to compute possible links and determine their restrictions.

Figure 10:
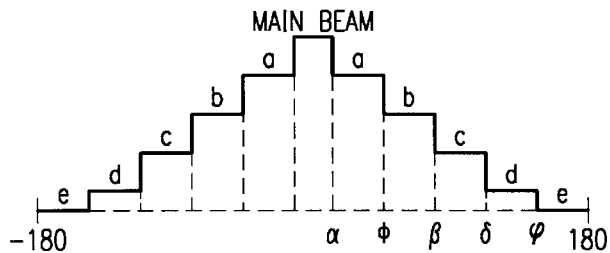
FIG. 10 is a bar graph of antenna loss associated with various antenna angles off of the broadside of a directional antenna such as shown in FIG. 1.

Directing attention to FIG. 10, a bar graph representation of the antenna loss at various angles off of the antenna broadside associated with a radiation pattern such as shown in FIG. 1 is provided. The quantities associated with the bar graph of FIG. 10 for a preferred embodiment of the present invention are presented in Table 9 below.

TABLE 9

| | Antenna Loss (dB) | | Antenna Angle (degrees) |
| --- | --- | --- | --- |
| a | 20 | α | 2 |
| b | 28 | φ | 4 |
| c | 40 | β | 16 |
| d | 48 | δ | 40 |
| e | 68 | Φ | 80 |

As will be appreciated from the discussion below, the particular angles selected for use in the computing of possible links are selected so as to correspond to threshold levels of interference which may be tolerated according to the design parameters of the links.

For interference type 3 cases a threshold link isolation is determined for placing the interfered source within the radio link. Generally the requirement is that the interference level is to be kept below the signal level by a preselected margin. For example −40 dB may be determined to be an appropriate margin of an interference level with respect to a desired signal level. However, it should be appreciated that dynamic changes, such as rain fades, may affect the reception of a signal and interference differently. For example, as the interfered source is disposed more near the interfering source than is the far end node of the link, a uniform rain density throughout this area will attenuate the desired signal more severely than the interfering signal. Accordingly, in configurations such as that of interference type 3, a margin is preferably built into the threshold link isolation. For example, where the radiation patterns associated with the values of Table 9 are deployed in rain region C (Crane rain model), interference level increase due to rain may be 28 dB. Therefore, a preferred embodiment threshold link isolation associated with interference type 3 is −68 dB (−40 dB interference margin having a −28 dB rain margin added thereto).

Figure 11:
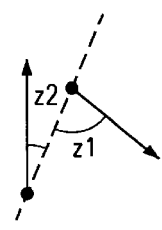
FIG. 11 is a graphical representation of the determination of an angle between two interfering antenna beams.

Having determined a threshold link isolation for circumstances where there is main beam to sidelobe communication within the radio hop, interference type 3, it can be seen by referencing Table 9 that antenna angles of 80 degrees or greater may be utilized to provide desired communication links. Directing attention to FIG. 11, determination of the antenna angles of Table 9 are shown to be the angle between the two beams as may be determined by the sum of the angles z1 and z2.

For interference type 4 cases a threshold link isolation is determined for placing the interfered source beyond the radio link. As with the case of interference type 3, the interference level is generally to be kept below the signal level by a preselected margin determined to be an appropriate margin of an interference level with respect to a desired signal level, such as the above example of −40 dB. It should be appreciated that the dynamic changes due to rain fades are not likely to affect the reception of a signal and interference differently in the main beam to sidelobe communication outside of the radio hop situation of interference type 4 because the interfered source is disposed farther from the interfering source than is the far end node of the link, and accordingly a uniform rain density throughout this area will attenuate the interfering signal more severely than the desired signal. Accordingly, a rain fade margin is not added to the threshold link isolation as in the interference type 3 above. Thus in the exemplary embodiment, the threshold link isolation associated with interference type 4 is −40 dB. Of course, where other dynamic changes are to be compensated for, the threshold link isolation may be adjusted accordingly.

Having determined a threshold link isolation for circumstances where there is main beam to sidelobe communication outside of the radio hop, interference type 4, it can be seen by referencing Table 9 that antenna angles of 16 degrees or greater may be utilized to provide desired communication links.

For interference type 5 cases a threshold link isolation is determined for placing the interfered source similarly to that of interference type 3, except that the location of the interfered source is outside the main beam of the interfering source. As with the cases above, the interference level is generally to be kept below the signal level by a preselected margin determined to be an appropriate margin of an interference level with respect to a desired signal level, such as the above example of −40 dB. It should be appreciated, as with interference type 3 above, that dynamic changes, such as rain fades, may affect the reception of a signal and interference differently. Accordingly, in configurations such as that of interference type 5, a margin is preferably built into the threshold link isolation, such as the above exemplary interference level increase rain margin of −28 dB. Therefore, in this embodiment threshold link isolation associated with interference type 5 is −68 dB (−40 dB interference margin having a −28 dB rain margin added thereto).

Having determined a threshold link isolation for circumstances where there is sidelobe to sidelobe communication within the radio hop distance, interference type 5, it can be seen by referencing Table 9 that antenna angles of 80 degrees or greater may be utilized to provide desired communication links.

For interference type 6 cases a threshold link isolation is determined for placing the interfered source similarly to that of interference type 4, except that the location of the interfered source is outside the main beam of the interfering source. As with the cases above, the interference level is generally to be kept below the signal level by a preselected margin determined to be an appropriate margin of an interference level with respect to a desired signal level, such as the above example of −40 dB. As with interference type 4 cases, it is unlikely that dynamic changes due to rain fades are likely to affect the reception of a signal and interference differently in the main beam to sidelobe communication outside of the radio hop situation of interference type 6 because the interfered source is disposed farther from the interfering source than is the far end node of the link, and accordingly a uniform rain density throughout this area will attenuate the interfering signal more severely than the desired signal. Accordingly, a rain fade margin is not added to the threshold link isolation as in interference types 3 and 5 above. Thus in the exemplary embodiment, the threshold link isolation associated with interference type 6 is −40 dB. Of course, where other dynamic changes are to be compensated for, the threshold link isolation may be adjusted accordingly.

Having determined a threshold link isolation for circumstances where there is sidelobe to sidelobe communication beyond the radio hop distance, interference type 6, it can be seen by referencing Table 9 that antenna angles of 16 degrees or greater may be utilized to provide desired communication links.

It should be appreciated from the above analysis, the antenna isolation needed to provide the desired quality of communication is either 68 or 40 dB in the above example. The antenna pattern is therefore preferably divided into regions of 0, 20, 28, 34 (not shown as the angle is too close to 40 dB), 40 and 68 dB. These values for dividing the antenna radiation pattern are preferably selected because the sum of two numbers is either 40 or 68 dB at minimum angles. The angles off of the antenna beam broadside associated with these values of antenna loss, as noted in Table 9 above are 2, 4, 16, 40 and 80. This division of the antenna radiation pattern provides for simple determination of minimum acceptable main beam directional offset between interfering radio links which will provide acceptable communication quality. Of course, where antenna patterns different than that of the example provided herein are used and/or different interference thresholds are selected, these divisions are adjusted according to the concepts described above.

Using simplified design rules which require simple computations, such as the angle and distance computations associated with the above described preferred embodiment, the master RF planning tool may easily provide computation of all possible links between identified nodes as shown in FIG. 7. Moreover, using these design rules not only may the possible links be determined, but so too may the restrictions on links be determined. For example, knowing that particular antenna angles and/or particular link direction reuse distances are required to provide a desired quality of communication, as indicated by the above preferred embodiment design rules, potential links which if both were utilized would violate these design rules, may be identified as restricted links.

Figure 12:
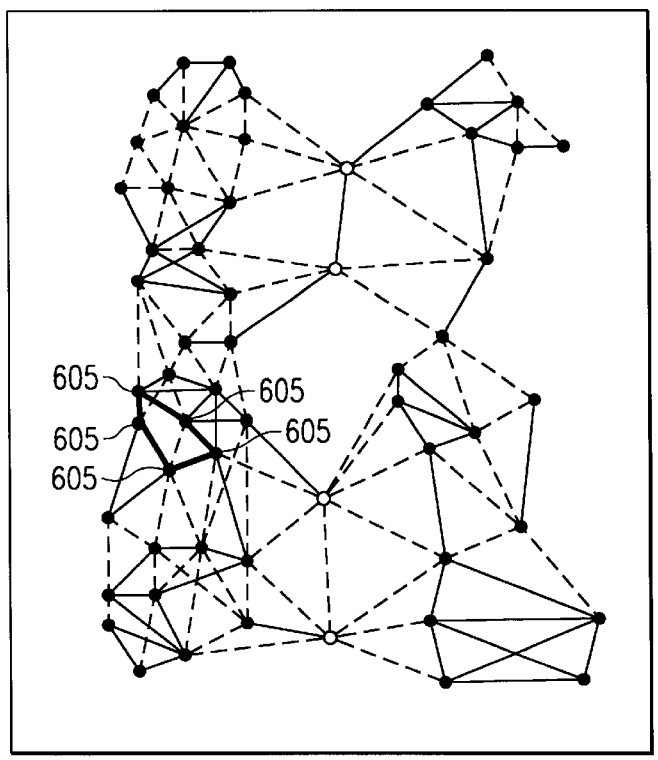
FIG. 12 is a graphical representation of possible links between the potential radio sites of FIG. 6 when existing links have been selected.

Directing attention to FIG. 12, it can be seen that when the existing links of existing nodes 605 are identified, indicated by the heavy link lines, that ones of the possible links computed previously are no longer available. This is because the design rules utilized by the master RF planning tool embodiment indicated that the now removed links were restricted and that the existing links were the links which caused the restriction. Also it can be seen that ones of the links with restrictions become links without restrictions as ones of the possible links have been removed from availability.

Referring again to FIG. 5, after determining possible links with restrictions and possible links without restrictions (step 515), the master RF planning tool embodiment selects preferred links of the possible links to provide the desired communication at step 520. In selecting preferred links of the possible links to provide the desired communication, the master RF planning tool may utilize parameters such as link distances, number of link hops between particular nodes, average number of link hops between subscriber nodes and service provider switching center or POP nodes, and the like. Additionally, as will be further explained with respect to an embodiment described below, the master RF planning tool may be provided link performance information, such as may be empirically derived through field verification and/or in-service monitoring, from which to identify preferred links and/or preferred link configurations. Additionally, or alternatively, an operator may identify preferred links and/or preferred link configurations, such as by information input at step 201.

Figure 13:
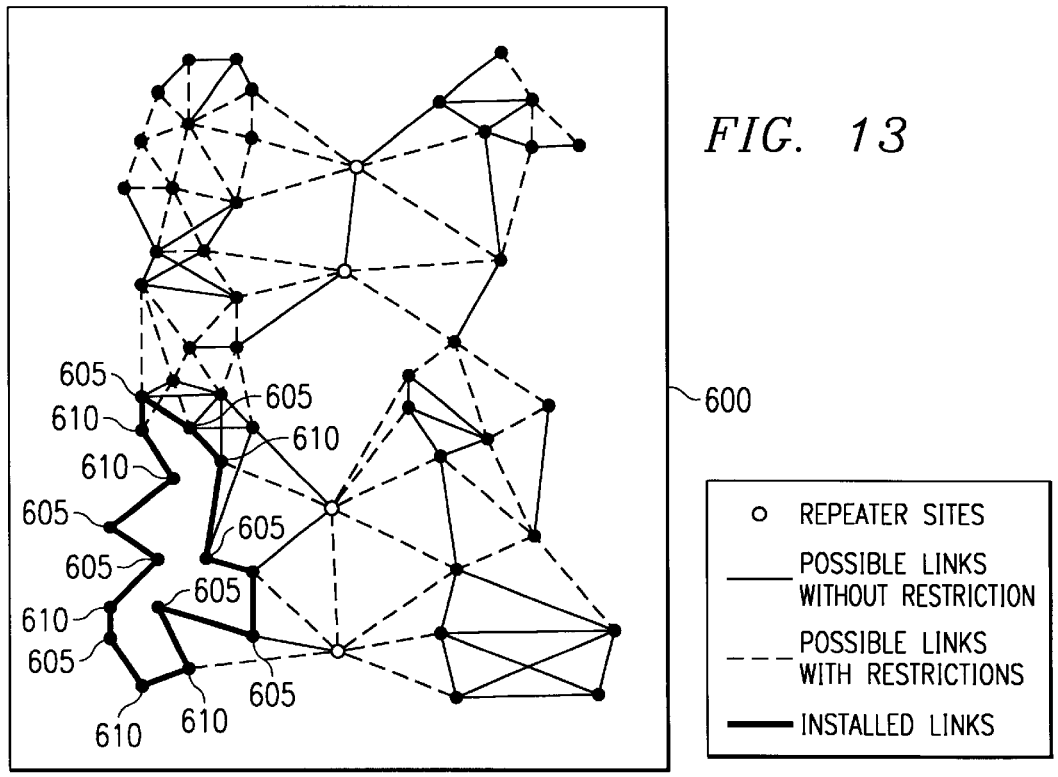
FIG. 13 is a graphical representation of possible links between the potential radio sites of FIG. 6 when existing links and other particular links have been selected.

Shown in FIG. 13 are selected preferred links of the possible links to provide desired communication between existing nodes 605 and upcoming nodes 610, shown in heavy link lines. It should be appreciated that selection of these preferred links has caused particular restricted ones of the possible links to become unavailable, i.e., removed from the set of possible links. The illustrated link configuration providing communication between existing nodes 605 and upcoming nodes 610 is but one possible link configuration. However, in this embodiment, the link configuration is selected as a preferred link configuration over these other possible link configurations based on considerations as described above.

Figure 14:
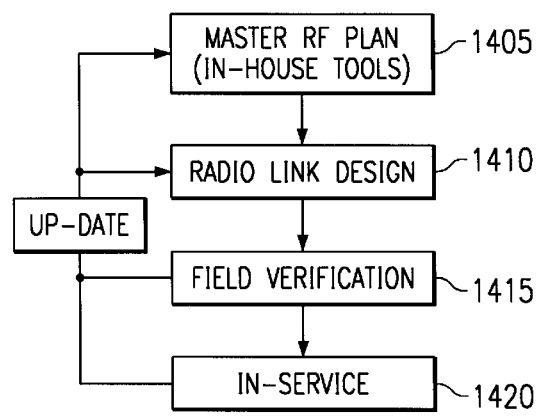
FIG. 14 is an illustration of multiple level analysis according to a preferred embodiment of the present invention.

In one embodiment of the present invention, the selected preferred links provided by the master RF planning tool may be implemented without further analysis. However, another embodiment of the present invention utilizes multiple levels of link analysis to optimize network link configuration. This embodiment multiple level analysis is shown in FIG. 14 wherein box 1405 represents a first order or master RF plan analysis, such as that of the master RF planning tool described above, box 1410 represents a second order or radio link design analysis, box 1415 represents a third order or field verification analysis, and box 1420 represents a fourth order or in-service analysis. Although four levels of analysis are illustrated in this embodiment of FIG. 14, it shall be appreciated that any number of levels of analysis may be utilized according to the present invention.

The multiple analysis levels of the present invention are adapted so as to provide complementary analysis of the links to thereby operate in cooperation to optimize the links selected. Accordingly, lower analysis levels may provide update information to higher analysis levels in order to enhance the ability of the present invention to select optimum link configurations. In this embodiment of FIG. 14 update information is fed back from the field verification and in-service analyses to the master RF plan and/or radio link design analyses. Similarly, update information is fed back from the radio link design analysis to the master RF plan analysis.

After a first order analysis of the possible links has been concluded, preferably providing a potentially usable subset of selected links as described above with respect to this embodiment of a master RF planning tool, a second order link analysis is performed, such as the radio link design 1410 of FIG. 14. Radio link design 1410 is a radio link design tool, such as Comsearch IQ Link, available from Comsearch Reston, Virginia, which provides detailed link design analysis, such as line of sight based on three dimensional mapping, link budget, three dimensional radio location and link, and/or interference computation. For example, the radio link design tool may determine if propagation in free space is likely to provide desired communication signal quality or if such propagation is impeded, such as by a building or other terrain feature of the deployment region blocking the line of sight, causing intolerable multipath conditions, or the like. However, as such detailed analysis typically requires considerable computing resources, its use according to the present invention analyzes only a portion of the possible links, such as links of the first order subset of links, i.e., those links remaining after restricted links have been eliminated which correspond to established or selected links, rather than all possible links, as analyzed in an embodiment first order analysis. This embodiment further restricts operation of the radio link design tool analysis to only the selected preferred links provided by the master RF planning tool, as these links of the subset of links which are most likely to actually be placed into service. For example, where the node sites are categorized as installed node sites, upcoming node sites, and potential node sites, the radio link design tool may perform detailed analysis only on those links associated with installed node sites and upcoming node sites, i.e., those nodes actually installed and those nodes scheduled for service in the future. Accordingly, potential node sites, i.e., those sites suitable for providing network communication thereto and/or those sites meeting some minimum threshold criteria such as a business location currently utilizing an identified minimum communication resource, may be omitted from this more resource demanding level of analysis. Accordingly, a more detailed, and presumably a more accurate, analysis than that of the master RF planning tool may be provided economically through cooperative use of the master RF planning tool and the radio link design tool.

It should be appreciated, however, that although the more detailed level of analysis is omitted with respect to particular ones of the links in this embodiment, these links have not been entirely omitted from the analysis according to the present invention. Specifically, this embodiment master RF planning tool of the present invention provides an analysis on every link possible for all identified node sites, whether they be installed, upcoming, or potential. Analysis of every possible link of this potentially large number of node sites is economically provided according to this embodiment in part due to the set of design rules utilized by this embodiment master RF planning tool, which will provide a good indication of links associated with the potential node sites which will not provide the desired communication quality level.

Through its detailed analysis, the radio link design tool may determine that particular ones of the links of the subset of links are unsuitable for use in providing communication at a desired quality level. If the radio link design tool determines ones of the links of the subset of links are unsuitable for use in providing communication at a desired quality level, the present invention preferably removes this, or these, particular links from the group of all possible links in the master RF planning tool, i.e. updates the master RF planning tool. Thereafter, the master RF plan analysis may again be performed which analyzes all remaining links between the identified group of network node sites to determine another potentially usable subset of all possible links. This subset is then preferably analyzed according to the radio link design analysis as described above. In this embodiment, this sequence of master RF plan analysis and radio link design analysis is performed until the subset of links is found to include links suitable for use in providing the desired communication quality.

Preferably after higher order analyses have been performed, such as the above described master RF plan analysis and/or radio link design analysis, a communication network system is deployed, altered, or expanded to provide links according to the results of these higher order analyses. Thereafter, communication is preferably established over these deployed links, such as initially in a commissioning phase, to provide a third order analysis, such as the embodiment field verification 1415, providing empirical field verification. Such field verification provides commissioning with end to end testing and may include the operation of communication equipment of the links of the network system to provide worst case operation scenarios to confirm communication signal quality levels provided under such conditions. Additionally or alternatively, field verification may include analyzing communication parameters at various ones of the links during communication of signals at other links of the network in order to determine the actual mutual interference experienced.

The field verification information derived from such analysis is used in updating higher order analyses, such as the embodiment of a master RF planning tool and/or the radio link design tool. For example, if particular links are discovered to provide communication quality less than that desired, information regarding these particular links may be provided to higher order analysis tools for their removal from the possible links in the master RF planning tool or the modification of their associated parameters in the radio link design tool. Similarly, data relevant to accurately modeling the links of the network, such as link degradation due to topological anomalies or mutual interference caused by multipath conditions, may be provided to the radio link design tool for more accurate determination of links useful in providing the desired communication quality.

In another embodiment, fourth order analysis is provided in the way of in-service analysis of the links, such as in-service analysis 1420. It shall be appreciated that although referred to herein as fourth order analysis, the in-service analysis may be provided in lieu of third order field verification as well as in addition to field verification. The in-service analysis of the links monitors link parameters during normal use of the links. Such parameters may include link quality measurements, such as a bit, or other, error rate, carrier to interference ratio, signal to noise ratio, link outage times, rain characteristic correlation of link interruption, and/or the like, as well as operating parameters of interest, such as receive signal power level, transmission power level, traffic loading, and/or the like.

This in-service information is used in updating the master RF planning tool and/or the radio link design tool of the present invention. For example, link quality measurements may be utilized in providing the above mentioned optimization of the links selected as the subset of links by the master RF planning tool. Additionally or alternatively, in-service information may be utilized by the radio link design tool to more accurately model the links of the networks.

Figure 15:
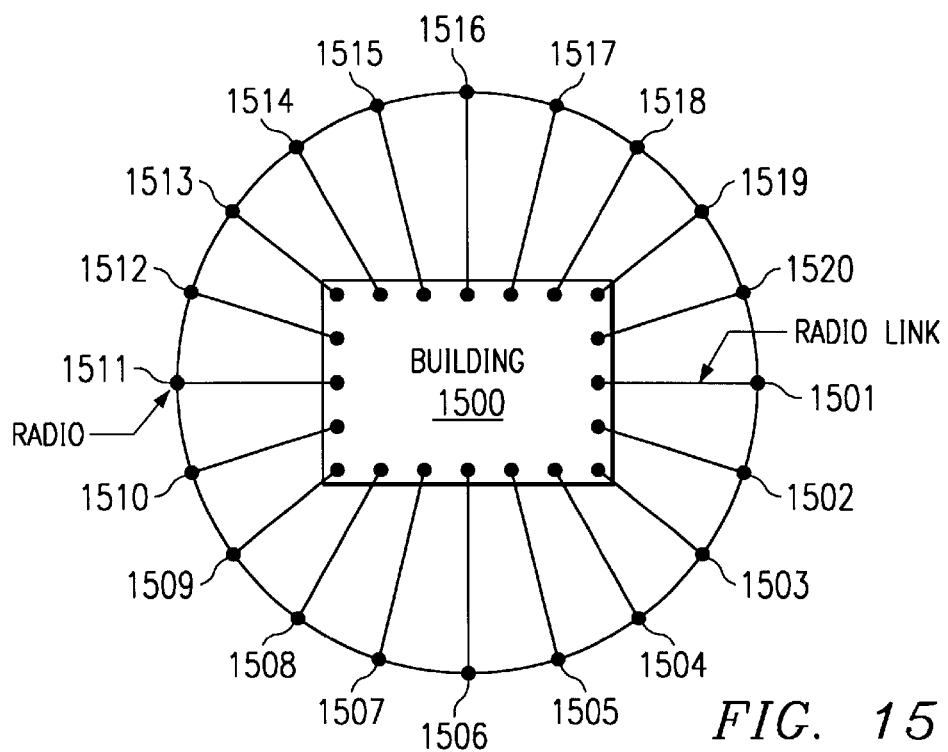
FIG. 15 is an illustration of deployment of a maximum number of radio links at a node site as determined by operation of the present invention.

An embodiment of the present invention identifies a distributing node site of the node sites to handle a large number of radio links (a distributing node site may also be referred to herein as a hub or hub node). Analysis according to the present invention may be utilized to determine a maximum number of links possible from such a distributing node site in order to provide for the efficient communication between a large number of radio links and this distributing node site. For example, following the design rules of the preferred embodiment described above, 20 radio links with 18 degrees of separation between each adjacent link to/from a distributing node site is theoretically possible. Accordingly, when the same frequency and same bandwidth is used for all links a frequency reuse factor of 20 is possible. This arrangement is shown in FIG. 15 where node site 1500 is in communication with node sites 1501–1520. Such an arrangement is especially useful in situations where communication services are being provided by a service provider, such as a competitive local exchange company (CLEC) or Internet service provider (ISP), through a single switch center or POP which may be coupled to the communication network through the distributing node site.

Analysis according to the present invention may be utilized to plan a deployment of radio links within a service region to maximize the use and availability of a resource, such as the above mentioned switch center or POP. Specifically, a preferred embodiment of the present invention operates to identify the type of nodes, such as to identify distribution or hub nodes and customer or subscriber nodes. Preferably, a connectivity algorithm of the automated radio network planning tool of the present invention determines all possible radio links from particular identified nodes, such as the aforementioned hub or distribution nodes, to other nodes, such as the aforementioned customer or subscriber nodes. Preferably, a radio link reduction algorithm of the automated radio network planning tool of the present invention removes undesired or unsupportable links, such as links having no-line of site interface, links having a radio link distance which is unacceptable, and the like, from the possible radio links. Thereafter, according to a preferred embodiment, a link co-existence testing algorithm of the present invention determines which links are independent and which inks are mutually dependent and a link optimization algorithm of the present invention further reduces the links to a reduced number or minimum number of links required for a network topology to provide optimized performance according to the design parameters, as is described in more detail above with respect to FIG. 2 above.

Figure 16:
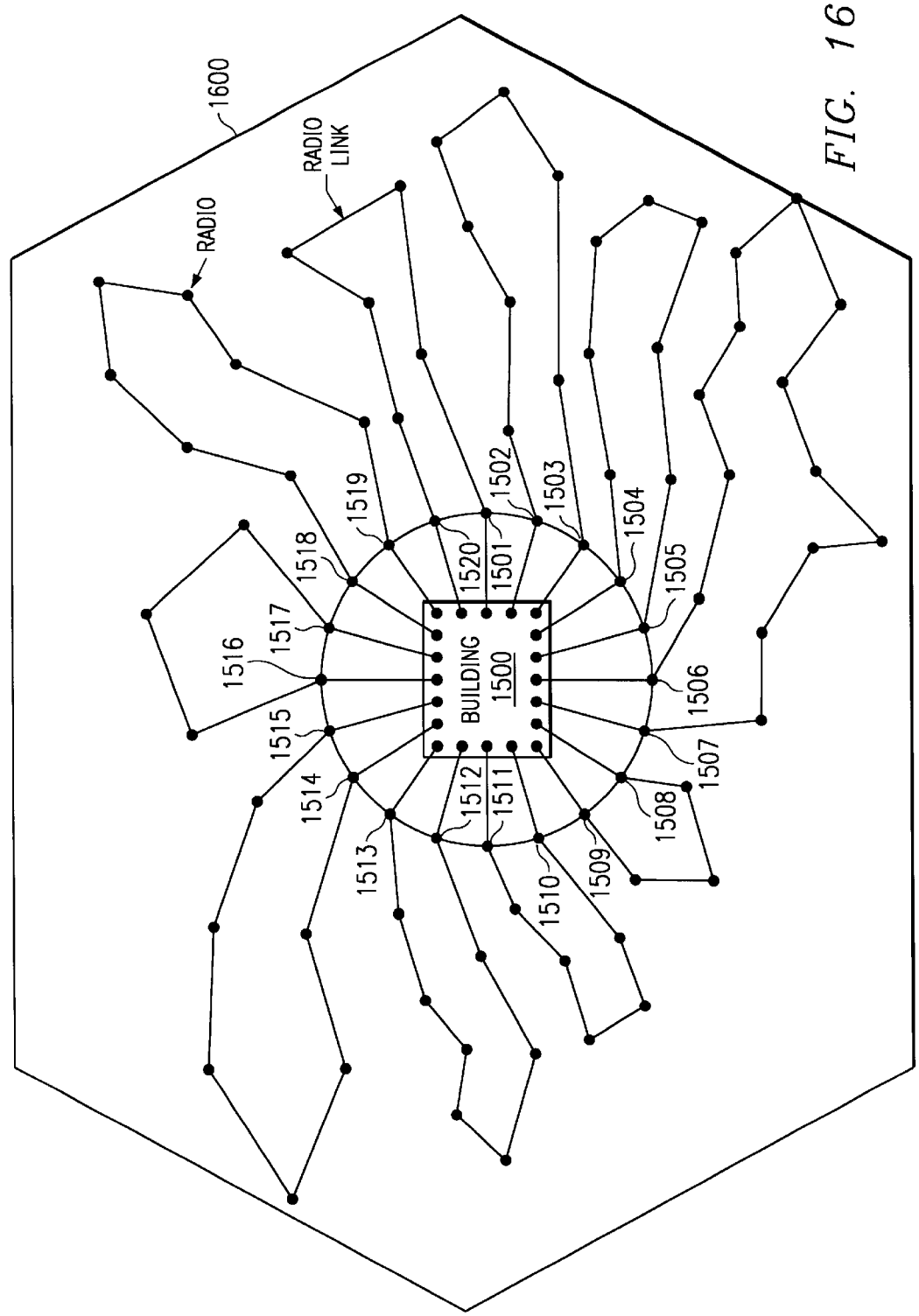
FIG. 16 is an illustration of deployment of the node site of FIG. 15 to provide concentration of signals.

Directing attention to FIG. 16, service region 1600, again having an arbitrary shape (here hexagonal to promote the below concept of regionalized concentration and back hauling), is shown providing communication between multiple node sites and distribution node site 1500 via node sites 1501–1520. The embodiment of FIG. 16 provides a total of 10 consecutive point topologies, i.e., point-to-point-to-point radio network rings, to/from distribution node site 1500. Where each consecutive point carries bi-directional OC-3 payload, the total traffic to/from such a distribution site is 10 bi-directional OC-3s or 1000 MHZ bandwidth per direction.

Figure 17:
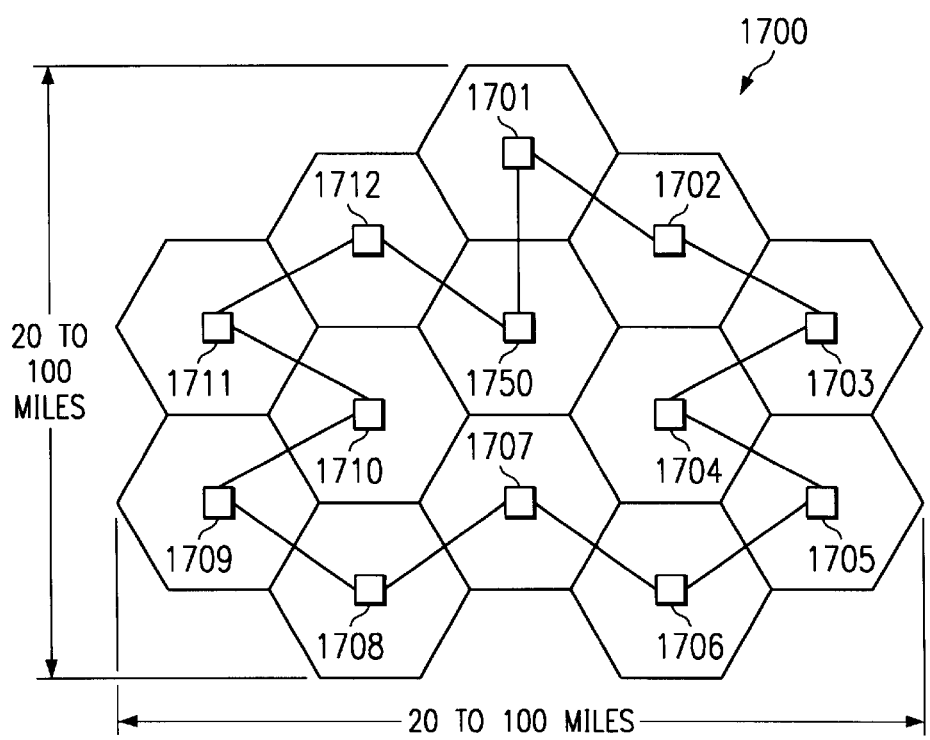
FIG. 17 is an illustration of deployment of multiple node sites of FIG. 15 to provide wide area concentration of signals.

A plurality of such distributing nodes may be utilized to provide back hauling or concentration of communications between a central point, such as the above mentioned witch center or POP, and a large number of nodes of the network and/or nodes of the network which are distributed over a large geographic area. For example, geographic service regions, such as hexagonal cell service region 1700, may be established wherein the node sites of each geographic region are coupled to a distributing node associated with that particular geographic region for communication with a switch center or POP serving the geographic regions. An embodiment of such a configuration is shown in FIG. 17, wherein node site 1750 is a shared resource, such as a switch center, and each of node sites 1701–1712 are distributing node sites, such as distributing node site 1600 shown in FIG. 16, and provide back hauling, such as by using a WDM fiber system, to node site 1700. The wide area deployment of the configuration of FIG. 17 allows a single resource, such as a switch center, to serve a wide area, such as an area of 100 by 100 miles. It shall be appreciated that node site 1700 may also be a distributing node site if desired. Moreover, although single distributing node sites are illustrated in each service region, multiple such distributing node sites may be deployed in some or all such service regions, if desired.

In a number of the embodiments described above, the possible effects of rain are included for wireless communication systems operating carrier frequencies between 20 and 60 GHz. Rainfall can be non-uniform over an area and non-uniform over a path. In terms of modeling, the rain fade is a time-variant variable. In the two-link analysis methodology the rain variable preferably is included as follows.

In a two-link configuration, there are two signal paths and two interference paths. Referring to FIG. 4A, the two signal paths are from the first transmitter 405 to the first receiver 410, and from the second transmitter 420 to the second receiver 415. Similarly, the two interference paths are from the first transmitter 405 to the second receiver 415, and from the second transmitter 420 to the first receiver 410. To simulate the effect of non-uniform rainfalls over the network topology, one can assign each path with different losses. Table 10 provides the 16 possible combinations for two-levels of rain conditions, storm and rain, over the two links. Table 10 is listed in order of severity of interference condition from the top row to bottom. The greatest severity is when both signal paths have the high rain attenuation and low attenuation in the interference paths. Referring again to FIG. 4A, the greatest severity would be when each of the signal paths, from first transmitter 405 to first receiver 410 and from second transmitter 420 to second receiver 415, have high rain attenuation from storm conditions, and both interference paths, first transmitter 405 to second receiver 415, and second transmitter 420 to first receiver 410, have low rain attenuation from rain alone. The least severe is the uniform loss for all four paths. Which one or group of these rain conditions is to be used is related by region climate. For example, the rain condition in Seattle City is more uniform than non-uniform. On the other hand, Miami City is highly non-uniform. However, the designer should choose one or a group of these conditions and apply to the methodology described above.

TABLE 10

| Signal path 1 | Interference in path 2 | Signal path 2 | Interference in path 1 |
| --- | --- | --- | --- |
| storm | rain | storm | rain |
| storm | rain | storm | storm |
| storm | storm | storm | rain |
| rain | rain | storm | rain |
| storm | rain | rain | rain |
| storm | storm | rain | rain |
| rain | rain | storm | storm |
| rain | storm | storm | rain |
| storm | rain | rain | storm |
| storm | storm | rain | storm |
| rain | storm | storm | storm |
| rain | storm | rain | rain |
| rain | rain | rain | storm |
| rain | storm | rain | storm |

TABLE 10-continued

| Signal path 1 | Interference in path 2 | Signal path 2 | Interference in path 1 |
| --- | --- | --- | --- |
| rain | rain | rain | rain |
| storm | storm | storm | storm |

It shall be appreciated that analysis of communication links according to the present invention may be accomplished utilizing instruction sets adapted according to the above described embodiments operable on a suitable processor based system, such as a general purpose computer system having a CPU, memory, and input and output devices. For example a general purpose computer system based on the INTEL 80X86 or PENTIUM processor platforms and operating under control of a general purpose operating system such as the WINDOWS or UNIX XWINDOWS operating systems, may be provided with application programs providing the above described functionality. To monitor actual operation of links and/or to provide update information between the multiple analysis levels of the preferred embodiment, particular interface connections to the processor based system may be desired. Of course, such information may be input manually, such as through operator manipulation of an input device, such as a keyboard or pointer.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for wireless link planning comprising:
a set of design rules broadly applicable to all wireless links of a group of wireless links for which wireless link planning is desired;
a database of radio node sites providing positional information with respect to other radio node sites contained in said database of radio node sites;
a processor in communication with said set of design rules and said database, said processor operable to compute possible wireless links between all pairings of said radio node sites contained in the database that contain a computation radio node site and a target radio node site and that include target radio node sites which are within the effective range of the computation radio node site, said processor further operable to apply said design rules to said wireless link possibilities, and to evaluate possible wireless links with respect to said set of design rules.

2. The system of claim 1, wherein said processor limits said pairings between said radio node sites to be within line of sight of each other.

3. The system of claim 1, wherein said set of design rules are adapted for use in discrete stages in which the number of possible wireless links are reduced to produce a favored topology.

4. The system of claim 1, wherein the processor includes environmental factors in said link budget equations.

5. A system for wireless link planning comprising:
- a set of design rules that represent link budget equations and are broadly applicable to all wireless links of a group of wireless links for which wireless link planning is desired;
- a database of radio node sites providing positional information with respect to other radio node sites contained in said database of radio node sites;
- a processor in communication with said set of design rules and said database, said processor operable to compute possible wireless links between all pairings of said radio node sites contained in the database that contain a computation radio node site and a target radio node site, said processor further operable to apply said design rules to said wireless link possibilities, and to evaluate possible wireless links with respect to said set of design rules, wherein said link budget equations represent a computation radio node site's signal strength at said target radio node site.

6. The system of claim 5, wherein said link budget equations represent computations concerning a received signal power at said target radio node site and an interference power at said target radio node site.

7. The system of claim 6, wherein said processor computes a ratio of said received signal power at the target radio node site to said interference power at the target radio node site.

8. The system of claim 7, wherein said link budget equations are represented as tables and said processor accesses said tables to determine link budget equation results.

9. The system of claim 8, wherein said tables are simplified by the estimation of variables within the link budget equations.

10. The system of claim 5, wherein said processor limits said pairings between said radio node sites to be within line of sight of each other.

11. The system of claim 5, wherein said set of design rules are adapted for use in discrete stages in which the number of possible wireless links are reduced to produce a favored topology.

12. The system of claim 5, wherein the processor includes environmental factors in said link budget equations.

13. A system for wireless link planning comprising:
- a set of design rules broadly applicable to all wireless links of a group of wireless links for which wireless link planning is desired, said set of design rules adapted for use in discrete stages in which the number of possible wireless links are reduced to produce a favored topology;
- a database of radio node sites providing positional information with respect to other radio node sites contained in said database of radio node sites;
- a processor in communication with said set of design rules and said database, said processor operable to compute possible wireless links between all pairings of said radio node sites contained in the database that contain a computation radio node site and a target radio node site, said processor further operable to apply said design rules to said wireless link possibilities, and evaluate possible wireless links with respect to said set of design rules, wherein a first discrete stage of said design rules is performed to identify all possible wireless links from the computation radio node site to the target radio node sites which are within line of sight of each other and within reaching distance of a radio located at the computation radio node site.

14. The system of claim 13, wherein a second discrete stage determines interferences between links in the network.

15. The system of claim 14, wherein said interferences are determined by interference computations which are performed between computation radio node sites and target radio node sites to determine interferences between the radio node sites.

16. The system of claim 15, wherein said interference categorizes each of said possible wireless links as one of mutually independent of other of said possible wireless links or mutually exclusive of other said possible wireless links.

17. The system of claim 16, wherein a third discrete stage eliminates possible wireless links based on said interferences between possible wireless links.

18. The system of claim 17, wherein the elimination of possible wireless links is performed by applying link selection criterion.

19. The system of claim 18, wherein said link selection criterion eliminates possible wireless links which interfere with the greatest number of other possible wireless links and provides remaining possible wireless links.

20. The system of claim 19, wherein a fourth discrete stage examines remaining possible wireless links and determines potential networks by using said remaining possible wireless links to provide a direct connection or a connection through another radio node site for all radio node sites.

21. The system of claim 20, wherein a fifth discrete stage examines said potential networks and by applying said design rules selects a favored topology.

22. The system of claim 15, wherein said set of design rules represent link budget equations, wherein said link budget equations represent a computation radio node site's signal strength at said target radio node site.

23. The system of claim 22, wherein said link budget equations represent computations concerning a received signal power at said target radio node site and an interference power at said target radio node site.

24. The system of claim 23, wherein said processor computes a ratio of said received signal power at the target radio node site to said interference power at the target radio node site.

25. The system of claim 24, wherein said link budget equations are represented as tables and said processor accesses said tables to determine link budget equation results.

26. The system of claim 25, wherein said tables are simplified by the estimation of variables within the link budget equations.

27. The system of claim 26, wherein said processor uses said table to categorize each of said possible wireless links as mutually independent of other of said possible wireless links or mutually exclusive of other said possible wireless links.

28. The system of claim 13, wherein the processor includes environmental factors in said link budget equations.

29. A method for planning dense network topology comprising the steps of:
- establishing a set of design rules broadly applicable to all wireless links of a group of wireless links for which wireless link planning is desired;

providing a database of radio node sites providing positional information with respect to other radio node sites contained in said database of radio node sites;

computing possible wireless links between all pairings of said radio node sites contained in the database that include target radio node sites which are within the effective range of the computation radio node site by at least considering the first of said radio node sites as a computation radio node site and the second as a target radio node site;

applying said design rules to said wireless link possibilities; and evaluating said possible wireless links with respect to said set of design rules.

30. The method of claim 29, wherein said step of computing possible wireless links between pairings of said radio node sites comprises the steps of:

limiting said pairings to pairings in which said radio node sites are within line of sight of each other.

31. A method for planning dense network topology comprising the steps of:

providing a database of radio node sites providing positional information with respect to other radio node sites contained in said database of radio node sites, considering the first of said radio node sites as a computation radio node site and the second as a target radio node site;

establishing a set of design rules broadly applicable to all wireless links of a group of wireless links for which wireless link planning is desired, including link budget equations within the design rules wherein said link budget equations represent a computation radio node site's signal strength at said target radio node site;

computing possible wireless links between all pairings of said radio node sites contained in the database;

applying said design rules to said wireless link possibilities; and evaluating said possible wireless links with respect to said set of design rules.

32. The method of claim 31, wherein said step of including link budget equations within the design rules comprises the steps of:

representing computations concerning a received signal power at said target radio node site and an interference power at said target radio node site within the design rules.

33. The method of claim 32, wherein said step of computing possible wireless links comprises the steps of:

computing a ratio of said received signal power at the target radio node site to said interference power at the target radio node site.

34. The method of claim 33, wherein said step of computing a ratio of said received signal power at the target radio node site to said interference power at the target radio node site comprises the steps of:

representing the ratio as tables and said step of computing possible wireless links accesses said tables to determine link budget equation results.

35. The method of claim 34, wherein said step or representing said ratio as tables comprises the steps of:

simplifying said tables by the estimation of variables within the link budget equations.

36. The method of claim 35, wherein said step of simplifying said tables comprises the steps of:

estimating table values based on radio performance parameters and system performance parameters.

37. The method of claim 31, wherein said step of computing possible wireless links between pairings of said radio node sites comprises the steps of:

limiting said pairings to pairings in which said radio node sites are within line of sight of each other.

38. A method for planning dense network topology comprising the steps of:

establishing a first set of design rules broadly applicable to all wireless links of a group of wireless links for which wireless link planning is desired;

establishing a second set of design rules specifically applicable to all wireless links of a group of wireless links for which wireless link planning is desired;

providing a database of radio node sites providing positional information with respect to other radio node sites contained in said database of radio node sites;

computing possible wireless links between all pairings of said radio node sites contained in the database;

applying said first set of design rules to said possible wireless links;

evaluating said possible wireless links with respect to said first set of design rules;

prioritizing said possible wireless links as a result of said step of evaluating said possible wireless links with respect to said first set of design rules;

generating a first prioritized list from the step of prioritizing said possible wireless links;

applying said second set of design rules to said first prioritized list;

evaluating said first prioritized list;

prioritizing said first prioritized list as a result of said step of evaluating said first prioritized list; and generating a second prioritized list.

39. The method of claim 38, further comprising the steps of:

establishing a third set of design rules specifically applicable to all wireless links of a group of wireless links for which wireless link planning is desired;

applying said third set of design rules to said second prioritized list;

evaluating said second prioritized list with respect to said third set of design rules;

prioritizing said second prioritized list as a result of said step of evaluating said second prioritized list with respect to said third set of design rules;

generating a third prioritized list from the step of prioritizing said second prioritized list.

40. The method of claim 39, further comprising the steps of:

establishing a fourth set of design rules specifically applicable to all wireless links of a group of wireless links for which wireless link planning is desired;

applying said fourth set of design rules to said third prioritized list;

evaluating said third prioritized list with respect to said fourth set of design rules;

prioritizing said third prioritized list as a result of said step of evaluating said third prioritized list with respect to said fourth set of design rules;

generating a fourth prioritized list from the step of prioritizing said third prioritized list.

41. A radio network planning tool comprising:

radio node information data including location information with respect to a plurality of radio nodes to be linked and information with respect to a type of one or more radio nodes of said plurality of radio nodes;

a radio link connectivity algorithm operable to determine potential radio links, wherein said determined potential radio links include radio links for establishing radio communication from a particular node of a first type of node of said plurality of radio nodes to a plurality of nodes of a second type of nodes of said plurality of radio nodes;

a radio link reduction algorithm operable to identify undesired links of said determined potential radio links;

a radio link co-existence algorithm operable to determine mutually independent links of said determined potential radio links; and a radio link optimization algorithm operable to select a subset of radio links of said potential radio links suitable for establishing communication between said particular node of said first type and said plurality of nodes of said second type.

42. The radio network planning tool of claim 41, wherein said first type of node is a distributing node.

43. The radio network planning tool of claim 42, wherein said second type of node is a subscriber node.

44. The radio network planning tool of claim 43, wherein said plurality of radio nodes to be linked includes only said first and second types of nodes and wherein said plurality of nodes of said second type includes all nodes of said second type of said plurality of radio nodes to be linked.

45. The radio network planning tool of claim 41, wherein said determined potential radio links includes all potential radio links between said radio nodes to be linked.

46. The radio network planning tool of claim 41, wherein said undesired links of said determined potential radio links include radio links which are unsupportable according to predetermined network apparatus criteria.

47. The radio network planning tool of claim 41, wherein said undesired links of said determined potential radio links include radio links which do not provide line of sight interfaces between radios of said nodes.

48. The radio network planning tool of claim 41, wherein said undesired links of said determined potential radio links include radio links which result in a radio link of excessive distance.

49. The radio network planning tool of claim 41, wherein selection of said subset of radio links comprises selection of a minimum number of radio links to establish communication meeting desired performance characteristics between said particular node of said first type and said plurality of nodes of said second type.

50. The radio network planning tool of claim 41, wherein selection of said subset of radio links comprises selection of a configuration of radio links to establish a maximum number of direct radio links between said particular node of said first type and ones of said plurality of nodes of said second type.

51. The radio network planning tool of claim 41, further comprising:

a user interface operable to accept human interaction with respect to selection of links of said determined potential radio links as said selected subset of radio links.

52. The radio network planning tool of claim 51, wherein said human interaction includes human overriding of identification of said undesired links.

53. The radio network planning tool of claim 51, wherein said human interaction includes identification of preferred radio links of said determined potential radio links.

54. The radio network planning tool of claim 53, wherein said identification includes a weighted hierarchy of ones of said determined potential radio links.

55. A method for radio network planning comprising:

storing radio node information data including location information with respect to a plurality of radio nodes to be linked and information with respect to a type of one or more radio nodes of said plurality of radio nodes;

determining potential radio links, wherein said determined potential radio links include radio links for establishing radio communication from a particular node of a first type of node of said plurality of radio nodes to a plurality of nodes of a second type of nodes of said plurality of radio nodes;

identifying undesired links of said determined potential radio links;

determining mutually independent links of said determined potential radio links; and selecting a subset of radio links of said potential radio links suitable for establishing communication between said particular node of said first type and said plurality of nodes of said second type.

56. The method of claim 53, further comprising:

accepting human interaction with respect to selection of links of said determined potential radio links as said selected subset of radio links.

57. The method of claim 55, wherein said storing radio node information comprises:

identifying at least said particular node of said first type of node as a distributing node.

58. The method of claim 55, wherein said storing radio node information comprises:

identifying each radio node of said plurality of radio nodes of said second type of node as a subscriber node.

59. The method of claim 55, wherein said determining potential radio links comprises:

determining all potential radio links between said radio nodes to be linked.

60. The method of claim 55, wherein said identifying undesired links comprises:

identifying radio links which are unsupportable according to predetermined network apparatus criteria.

61. The method of claim 55, wherein said identifying undesired links comprises:

identifying radio links which do not provide line of sight interfaces between radios of said nodes.

62. The method of claim 55, wherein said identifying undesired links comprises:

identifying radio links which result in a radio link of excessive distance.

63. The method of claim 55, wherein said selecting a subset of radio links comprises:

selecting a minimum number of radio links to establish communication meeting desired performance characteristics between said particular node of said first type and said plurality of nodes of said second type.

64. The method of claim 55, wherein said selecting a subset of radio links comprises:

selecting a configuration of radio links to establish a maximum number of direct radio links between said particular node of said first type and ones of said plurality of nodes of said second type.

* * * * *